(12) United States Patent
Hobbs

(10) Patent No.: US 8,187,481 B1
(45) Date of Patent: May 29, 2012

(54) RANDOM TEXTURE ANTI-REFLECTION OPTICAL SURFACE TREATMENT

(75) Inventor: Douglas S. Hobbs, Lexington, MA (US)

(73) Assignee: Coho Holdings, LLC, Burlington, MA (US)

( * ) Notice: Subject to any disclaimer, the term of this patent is extended or adjusted under 35 U.S.C. 154(b) by 495 days.

(21) Appl. No.: 11/381,828

(22) Filed: May 5, 2006

Related U.S. Application Data

(60) Provisional application No. 60/678,126, filed on May 5, 2005.

(51) Int. Cl.
*B29D 11/00* (2006.01)
*C03C 15/00* (2006.01)

(52) U.S. Cl. ............................................. 216/24; 216/67

(58) Field of Classification Search .................. 216/24, 216/41, 57, 52, 67, 80; 359/578
See application file for complete search history.

(56) References Cited

U.S. PATENT DOCUMENTS

| | | | |
|---|---|---|---|
| 4,013,465 A | 3/1977 | Clapham et al. | |
| 4,496,216 A | 1/1985 | Cowan | |
| 4,791,073 A * | 12/1988 | Nagy et al. | 438/435 |
| 5,334,342 A | 8/1994 | Harker et al. | |
| 6,023,063 A | 2/2000 | Norton | |
| 6,245,493 B1 * | 6/2001 | Singh et al. | 430/327 |
| 6,406,640 B1 * | 6/2002 | Yang et al. | 216/67 |
| 6,483,635 B1 | 11/2002 | Wach | |
| 2002/0104821 A1 * | 8/2002 | Bazylenko et al. | 216/24 |
| 2003/0178057 A1 * | 9/2003 | Fujii et al. | 136/256 |
| 2005/0074579 A1 * | 4/2005 | Suzuki et al. | 428/141 |
| 2005/0233083 A1 | 10/2005 | Schulz et al. | |
| 2006/0144413 A1 * | 7/2006 | Yoneda et al. | 132/53 |

OTHER PUBLICATIONS

Xiao He. et al. (Computer Graphics, vol. 25, No. 4, Jul. 1991, pp. 175-186).*
Southwell, W.H., "Pyramid-array surface-relief structures providing antireflection index matching on optical surfaces," JOSA A, vol. 8, No. 3, p. 549-553, Mar. 1991.
Raguin, D.H & Morris, G.M., "Antireflection structured surfaces for the infrared spectral region," Applied Optics, vol. 32, No. 7, p. 1554-1167, Mar. 1991.
DeNatale, J.F., et al., "Fabrication and characterization of diamond moth eye antireflective surfaces on Ge," J. Appl. Phys., 71 (3), p. 1338-1393, Feb. 1992.
Harker, A.B. & DeNatale, J.F., "Diamond gradient index 'moth-eye' antireflection surfaces for LWIR windows," SPIE vol. 1760, Window and Dome Technologies, p. 261-267, Jul. 1992.
Hobbs, D.S., et al., "Automated Interference Lithography Systems for Generation of Sub-Micron Feature Size Patterns," SPIE Conf., Proc. SPIE, vol. 3879, p. 124-136, Sep. 1999.
Weimer, W.A. & Klocek, P., "Advances in low-cost long-wave infrared polymer windows," SPIE vol. 3705,Window and Dome Technologies, p. 276-281, Apr. 1999.

* cited by examiner

*Primary Examiner* — Nadine G Norton
*Assistant Examiner* — Mahmoud Dahimene
(74) *Attorney, Agent, or Firm* — Brian M. Dingman; Mirick, O'Connell, DeMallie & Lougee, LLP

(57) ABSTRACT

A surface relief structure consisting of a random distribution of surface features with varying feature profile and depth, is described. The texture serves to suppress the reflection of electromagnetic waves in the optical region of the spectrum without dispersing any portion of the spectrum by diffraction. Processes for fabricating the random distribution anti-reflecting textures in common materials are also described. The disclosed textures are particularly useful as anti-reflecting covers for displays, and as directly molded anti-reflecting surfaces in eyeglass lenses. Other applications such as covers for artwork, and improved solar cells are made practical by the invention.

14 Claims, 22 Drawing Sheets

Prior Art

RANDOM TEXTURE ANTI-REFLECTION OPTICAL SURFACE TREATMENT

CROSS REFERENCE TO RELATED APPLICATION

This application claims priority of Provisional Application Ser. No. 60/678,126, filed on May 5, 2005 entitled "RANDOM TEXTURE ANTI-REFLECTION OPTICAL SURFACE TREATMENT".

FIELD OF THE INVENTION

This invention relates to methods for the suppression of reflected light from optical devices such as solar panels, electronic imaging sensors, windows and lenses. Anti-reflection treatments are used widely throughout the optics industry in applications ranging from eyeglasses, lasers, cameras, solar cells, and lithography systems operating on the visible and near infrared light spectrum, to windows, missile domes, security cameras, and laser systems operating on the infrared spectrum.

BACKGROUND OF THE INVENTION

Information and video displays are used widely in automotive applications, computers, and hand-held devices such as mobile phones and personal digital assistants (PDAs). Light reflecting from instrument panel and center console automobile displays is distracting to drivers and necessitates overhanging dashboard designs that take up valuable interior space. A recent trend toward displaying increasing amounts of information with navigation and communication systems, has compounded the problem of stray light reflection. The glare of unwanted reflected light from mobile phone and automobile instrument panels is an even more severe problem due to the addition of plastic cover windows that are designed to protect the display from damage due to constant handling or cleaning. The reflection of light from plastic display covers is an everyday nuisance to cell phone users who find that the display cannot be read under typical daylight conditions because of strong reflections. Even at night the contrast of displays is reduced by the reflection of light generated by the display itself, or by superimposed reflected images of room lights.

With prescription eyeglasses, reflected light produces overlapping images that hamper the wearer's vision significantly. In particular, reflections from car headlights are a severe problem for eyeglass wearers driving at night. Sunglass wearers have a similar problem during the day where reflections from the lens surface nearest the eye create a distracting image of the wearer's own eye. In addition, reflected light off the front or external lens surface decreases the amount of light transmitted to the eye and thus decreases the optical quality of the lens noticeable to the wearer. This external reflection also produces an annoying shine or glare to an observer of the person wearing the eyeglasses. Glare or glint and decreased light transmission become severe in other optical systems that have multiple reflective surfaces such as the compound lenses found in cameras, microscopes and telescopes.

Converting light from the sun into electricity involves the absorption of the sun's light energy by semiconductor materials such as silicon. The surface of silicon is highly reflective, reflecting a minimum of 30% of the sun's light. AR treatments for silicon solar cells can provide an immediate 30% increase in absorbed solar energy.

Reflected light is a major problem in military, industrial, space and commercial applications that employ infrared (IR) light. Laser communication systems, active and passive imaging sensors, industrial cutting, welding, and marking lasers, and a variety of security devices, typically require durable infrared transmitting windows and optics made of materials such as zinc selenide (ZnSe), zinc sulfide (ZnS or Cleartran®), germanium (Ge), sapphire, silicon, and gallium arsenide (GaAs). Just one surface of a ZnSe window will reflect 17% of the long wave IR (LWIR—7 to 14 micron wavelength) light incident on-axis, a cadmium zinc telluride (CZT) window reflects 21%, and a Ge window or optic will reflect over 36%. The problem gets worse for IR light incident at higher angles off the normal to the window. Such large reflections produce stray light and can lead to superimposed images that can reduce the contrast or even blind security cameras or the night imaging systems found on aircraft, ground equipment, and satellites. Because of the high power levels of many industrial cutting and welding lasers, it is crucial that reflected light from the window and optic materials used is suppressed sufficiently to avoid damage to nearby objects.

The conventional approach to suppressing reflections from optics and windows is to employ multiple thin layers of dielectric materials deposited onto the external surface of the window or optic. This long established method is known in the art as a thin-film anti-reflection (AR) coating. Each deposited layer of material is designed to affect destructive interference for a particular wavelength of light reflecting from the window or optic surface. A great number of thin-film layers are needed to increase the range of wavelengths over which reflections are suppressed. For adequate anti-reflection (AR) over the LWIR range, a typical design would call for as many as 25 layers of material with a total deposited thickness of over 10 microns. In addition, the performance of thin-film AR coatings is limited to applications where light is incident along or near the system axis (normal to the window or optic external surface). For stray light incident off-axis, thin-film coating stacks can produce an increase in reflected light and undesirable polarization effects.

Thin-film AR coatings are typically deposited by high temperature evaporation of the coating materials within a vacuum chamber, a costly process that is problematic for some temperature sensitive materials used in IR cameras or plastics used in visible light applications. Durability and thermal cycling are a concern with thin-film AR coatings where inherent stress and adhesion problems are found due to dissimilar thermal expansion coefficients of the layer materials. Loss of thin-film adhesion from temperature cycling has resulted in catastrophic failure of space-based IR cameras and industrial lasers. Thin-film AR stacks suffer from degradation and short lifetimes in the presence of solar radiation and other harsh environments such as with rain and sand erosion in many military applications. The absorption and dissimilar thermal dispersion found with thin-film AR stacks limits the power attainable with solid state laser designs. Lastly, for display applications, AR coatings are generally not employed due to cost, lifetime, and performance issues such as poor viewing angle, durability, and adhesion loss. Diffuse textured surfaces are sometimes used for display applications such as televisions and computer monitors at the expense of image clarity.

The concept of using surface structures in lieu of thin film coatings to control reflections from optical surfaces has been discussed since the 1970s. The principle is derived from the work of Bernhard et al, who discovered that the eye of the night moth reflects very little light, due to the graded index nature of the moth's cornea. It was hypothesized that the low reflectivity surface of the moth's eye imparted a degree of stealth that protected the moth from its predators, primarily the owl. Wilson and Hutley fabricated the first artificial Motheye surfaces in photoresist using holographic lithography, and demonstrated the concept of Motheye replication using a nickel shim produced by a standard electroforming process. Cowan advanced the fabrication of Motheye textures by closely matching the structure found in nature. In the years since, there has been great interest in the Motheye AR principle, producing several patents and journal publications describing the optical properties and function of these graded index surfaces.

In practice, the surface relief microstructures that make up a Motheye texture, have proven to be an effective alternative to thin-film AR coatings in many IR and visible light applications where durability, radiation resistance, low thermal effects, wide viewing angle, or broad-band performance is critical. These microstructures are built into the surface of the window or optic material, imparting an optical function that minimizes reflections without compromising the inherent properties of the material. Typically, an array of pyramidal surface structures is used that provides a gradual change of the refractive index for light propagating from air into the bulk optic material. Reflection losses are reduced to a minimum for broadband light incident over a wide angular range. In general, these surface relief structures will exhibit similar characteristics as the bulk material with respect to durability, thermal issues (light absorption), and radiation resistance. The problems associated with thin-film coating adhesion, stress, abrasion resistance and lifetime, are eliminated.

To achieve high performance AR with surface relief microstructures, optical phenomena such as diffraction and scattering must be avoided. This requires that the surface structures be fabricated with a periodic spacing smaller than the shortest wavelength employed by the application. In addition, the height and profile of the surface structures should be sufficient to ensure a slowly varying density change.

As general design guidelines, the minimum relief height of the microstructures that make up an AR texture should exceed 40% of the longest operational wavelength, and the distance between structures should be less than 25 to 30% of the shortest operational wavelength to avoid free-space diffraction losses.

For narrow-bandwidth applications such as laser communications, a simpler type of AR surface structure called a sub-wavelength, or "SWS" surface, is used. An SWS is a porous texture that reduces the effective refractive index of the material surface, creating the equivalent of a textbook single-layer, quarter-wave thick, thin-film AR treatment at the design wavelength. Holes in the surface of the material are proportioned to create an effective refractive index equal to the square root of the window material refractive index. For example with an optic made of fused silica glass, the effective index yielded by fabricating a porous SWS texture is 1.21, a value that is not attainable with thin-film coating materials. The depth of the holes in the SWS array is set to one quarter of the design wavelength divided by the effective index. SWS textured windows have been demonstrated that suppress near IR light reflections to levels below the stringent requirements of optical fiber telecommunications (−30 dB, 0.1%).

Both Motheye and SWS AR textures are composed of periodic arrays of surface structures. The periodic nature of these textures produces diffraction effects for light incident at steep angles. For example, a Motheye texture with a 250 nanometer (nm) spacing will diffract visible light in the blue-violet region when the light is incident at an angle greater than 60 degrees off the normal to the window surface. This free-space propagating light is undesirable in certain applications such as the display covers and eyeglasses mentioned above, and for infrared imaging applications that combine visible and infrared scenes. Some mid- or long-wave infrared applications require an AR treatment that also provides a level of camouflage or stealth when observed in visible light or in another region of the infrared spectrum.

There is an immediate need for an optical AR treatment that can provide the performance of Motheye surface textures without producing an observable spread of color at shorter wavelengths due to diffraction. There is also a need for a fabrication process to produce an optical AR treatment without the size limitations and costs associated with optical lithography or thin-film deposition systems.

A process for fabricating non-periodic AR textures that do not produce free-space diffracted light, is disclosed by Schulz et al. in Publication Number US2005/0233083 (Oct. 20, 2005). The texture fabrication process involves the physical ablation of material from the surface of an acrylic plastic using accelerated ions of argon or oxygen generated in a vacuum chamber. The technique disclosed is limited to the fabrication of AR textures in just one type of material—specifically PMMA based plastic—and is not immediately practical for high volume production of eyeglasses or plastic films for displays due to the high costs associated with scaling the vacuum-based process to produce large size parts, sheet film, or higher quantities of parts.

SUMMARY OF THE INVENTION

One aspect of the present invention involves a surface texture AR treatment that consists of a random distribution of features and feature sizes such that when broad-spectrum light interacts with the texture, no organized diffracted light is observed at any wavelength.

Another aspect of the present invention involves a process for fabricating a surface texture AR treatment that consists of a random distribution of features and feature sizes without use of any form of lithography.

Another aspect of the present invention is to provide a random distribution surface texture AR treatment that operates on visible light with a minimum of observable scattered light.

Another aspect of the present invention is to provide a random distribution surface texture AR treatment replicated into plastic eyeglasses, lenses, optics or windows that operate on visible light with a minimum of observable scattered light.

Another aspect of the present invention is to provide a method for fabricating a random distribution surface texture AR treatment etched directly into various window and optic materials such as glass, sapphire (Al2O3), zinc selenide (ZnSe), gallium arsenide (GaAs), cadmium zinc telluride (CZT), germanium (Ge), silicon (Si), and a variety of plastic materials that transmit visible or infrared light with a minimum of observable scattered light.

Another aspect of the present invention is to provide a method for fabricating a random distribution surface texture AR treatment etched directly into various window and optic materials such as glass, Al2O3, ZnSe, GaAs, CZT, Ge, Si, and a variety of plastic materials that efficiently transmits infrared light with little reflection loss while simultaneously providing a selectable level of observable scattered light in the visible spectral region.

Another aspect of the present invention is to provide a method for fabricating a random distribution surface texture AR treatment etched directly into a material such as glass, plastic or silicon that is shaped as a cylinder or roller, in a manner that allows for the continuous, or seamless replication of the random distribution AR texture on plastic sheet film. For example the external surface of a glass tube can be fabricated such that the inventive AR texture is distributed over the surface with no gaps, raised areas, or seams that would produce an observable edge or break in the AR function. A metal rod can be inserted in the AR textured tube to yield a roller that can be used in standard roll-to-roll replication processes that produce cured plastic films in sheet form.

In one application, the present invention provides an AR treatment for eyeglasses that can be directly etched into the eyeglass lens material, or replicated into the surface of a plastic lens using standard molding techniques. For example, the inventive AR treatment can be fabricated in the surface of a glass mold that is then used to cast multiple plastic lenses by injecting a liquid plastic monomer and then hardening the plastic by exposure to heat, high-energy electrons, or ultra-violet light. Conventional electroforming techniques can also be used to transfer the inventive AR texture from a glass or plastic surface to the surface of a hard metal mold, or shim, typically made of nickel.

In another application, the present invention provides an AR treatment for displays or protective display covers that can be directly etched into the surface of the display material, or replicated into the surface of a display, or display cover material using standard replication techniques.

In another application, the present invention provides an AR treatment that can be employed to produce an aesthetic appeal such as a flat-black or matte appearance in plastic sheets or fabrics that are opaque to visible light. Such textures are particularly useful in automotive applications where sheet vinyl and other plastics used on dashboards, side panels and seat covers desire a velvet black appearance. The inventive texture can be directly etched into the surface of a glass or plastic material, or the texture can replicated into the surface of the final product using standard replication techniques such as roll-to-roll embossing or injection molding using a hardened nickel shim.

In another application, the present invention provides an AR treatment for solar cells or solar cell protective covers that can be directly etched into the surface of the solar cell or solar cell protective cover material, or replicated into the surface of a solar cell or solar cell protective cover material using standard replication techniques.

In another application, the present invention provides a process for producing surface relief microstructures with a random distribution over the surface of large area glass or plastic windows that in combination with titania or other material coatings, may be useful for the inexpensive production of hydrogen split from water using sunlight.

In still another application, the present invention provides an AR treatment for infrared transmitting windows or optics that can be directly etched into the surface of the window or optic material, or replicated into the surface of a window or optic material using standard replication techniques. With some embodiments of the present invention, an infrared transmitting window or optic can be realized with a high performance AR treatment combined with a visible light scattering function to provide a level of stealth or camouflage.

These advantages of the present invention will become more apparent from the following specification and claims.

This invention features an apparatus for suppressing the reflection of electromagnetic waves that are incident on the structure from an environment with lower refractive index, the apparatus comprising a substrate with a surface relief texture in a substrate containing structures with a random distribution of structure spacing and structure depth, where the structure spacing is everywhere smaller than the wavelength of the electromagnetic waves, the structure depth is no less than half the dimension of the largest wavelength of the electromagnetic waves, and the refractive index of the surface relief texture structure density increases generally monotonically from the environment in a direction perpendicular to the bulk material substrate.

The reflection of electromagnetic waves from the surface relief texture is preferably at least eight times less than the reflection of electromagnetic waves from the same surface with no surface relief structures. The loss in transmission of electromagnetic waves due to scattering through the surface relief texture is preferably no more than one percent. The wavelength range of electromagnetic waves in which the scattering is no more than one percent can extend from 370 to 800 nanometers, from 400 to 1100 nanometers, from 1000 to 6000 nanometers, from 6000 to 14000 nanometers, or from 1500 to 12000 nanometers. The incident electromagnetic waves may be incident to the substrate at an angle in the range of from 0 to 30 degrees or from 0 to 60 degrees.

The surface relief structure may be fabricated in a substrate material consisting of glass, plastic, or silicon, or in a substrate material consisting of glass, plastic, sapphire, zinc selenide, zinc sulphide, silicon, gallium arsenide, germanium, cadmium telluride, yttrium aluminum garnet, yttrium oxide, or equivalent infrared transmitting material.

Also featured in the invention is a process for fabricating an apparatus for suppressing the reflection of electromagnetic waves, by exposing a surface of a substrate to a gas plasma ignited between electrodes connected to an electric potential, the surface of the substrate positioned between the electrodes such that the substrate is attacked both chemically and physically by the gas plasma. The gas plasma may consist of a mixture of tri-fluoromethane, ($CHF3$), and oxygen. The gas plasma may consist of a mixture of tri-fluoromethane, ($CHF3$), and oxygen in the ratio of about 7 parts $CHF3$ to about 1 part oxygen. The gas plasma may consist of at least two gases selected from the group of gases consisting of tri-fluoromethane, ($CHF3$), carbon tetrafluoride, ($CF4$), methane, ($CH4$), hydrogen, ($H2$), bromo-tri-fluoromethane, ($CBrF3$), sulfur hexafluoride, ($SF6$), argon and oxygen. The gas plasma may also be concentrated, or shaped between the electrodes by application of an external magnetic field, a technique known in the art as inductively coupled plasma, or ICP. The plasma power, or quantity of ionized molecules, can be varied over the range of from 25 to 1200 watts. The substrate material may be glass or plastic.

Also featured is a process for fabricating an apparatus for suppressing the reflection of electromagnetic waves, the process comprising the steps of first etching a surface of a substrate by exposing it to a gas plasma ignited between electrodes connected to an electric potential, the surface of the substrate positioned between the electrodes such that the substrate is attacked both chemically and physically by the gas plasma, and second employing the etched substrate surface as a master mold in a standard replication process.

Further featured is a process for fabricating an apparatus for suppressing the reflection of electromagnetic waves, the process comprising the steps of first etching a surface of a substrate by exposing it to a gas plasma ignited between electrodes connected to an electric potential, the surface of the substrate positioned between the electrodes such that the substrate is attacked both chemically and physically by the gas plasma, second depositing a layer of material onto the etched substrate surface to modify the surface texture to suit a specific application, and third employing the modified etched substrate surface as a master mold in a standard replication process.

Also featured is a process for fabricating an apparatus for suppressing the reflection of electromagnetic waves, the process comprising the steps of first etching a surface of a substrate by exposing it to a gas plasma ignited between electrodes connected to an electric potential, the surface of the substrate positioned between the electrodes such that the substrate is attacked both chemically and physically by the gas plasma, second depositing a layer of material onto the etched substrate surface to modify the surface texture to suit a specific application, third replicating the modified etched substrate surface into the surface of an alternative substrate, and fourth employing the alternative substrate surface as a master mold in a standard replication process.

Figure 1:
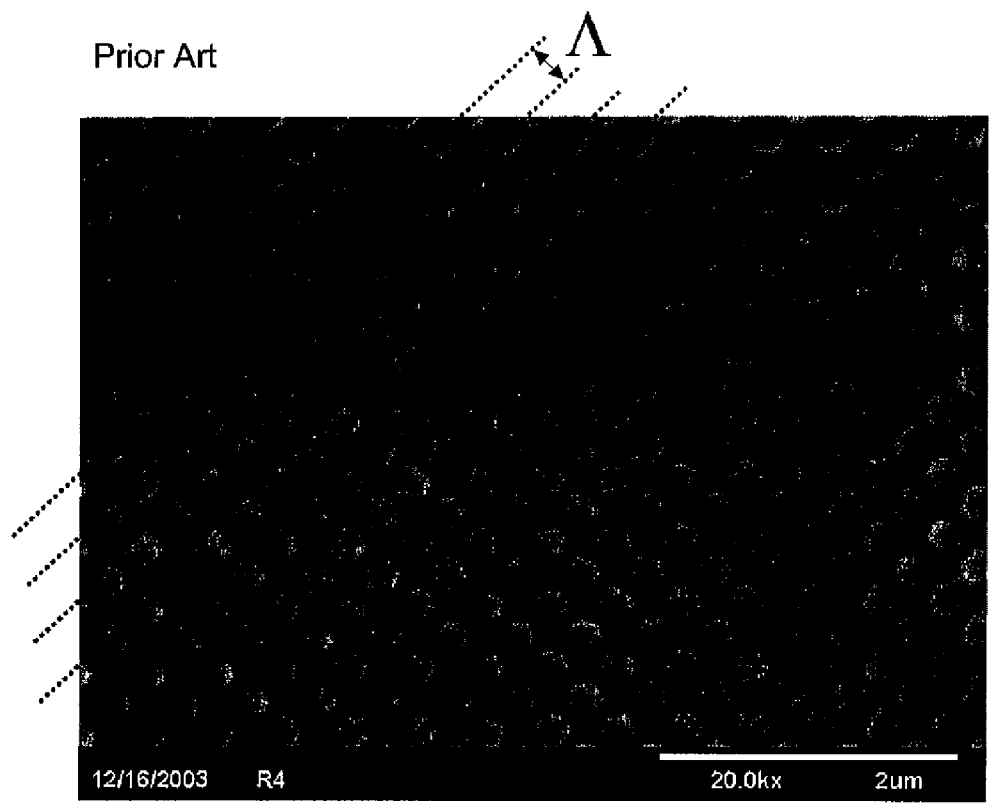
FIG. 1 depicts micrographs of prior art artificial Motheye textures replicated in a plastic window.
Figure 1:
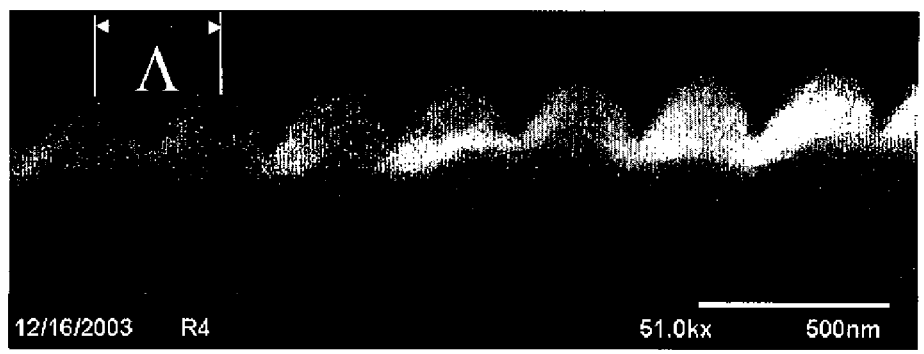

The foregoing and other objects features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

FIG. 1 shows scanning electron microscope (SEM) photographs of a Motheye anti-reflection texture molded in a plastic window by a direct casting process. An overhead view and a cross sectional profile are shown. Dashed lines indicate the pattern repeat period, or pitch, labeled as Λ. Cone structures are shown with a spacing of about 250 nanometer (nm), and a comparable depth. The texture is designed to suppress reflected light in the visible region.

Figure 2:
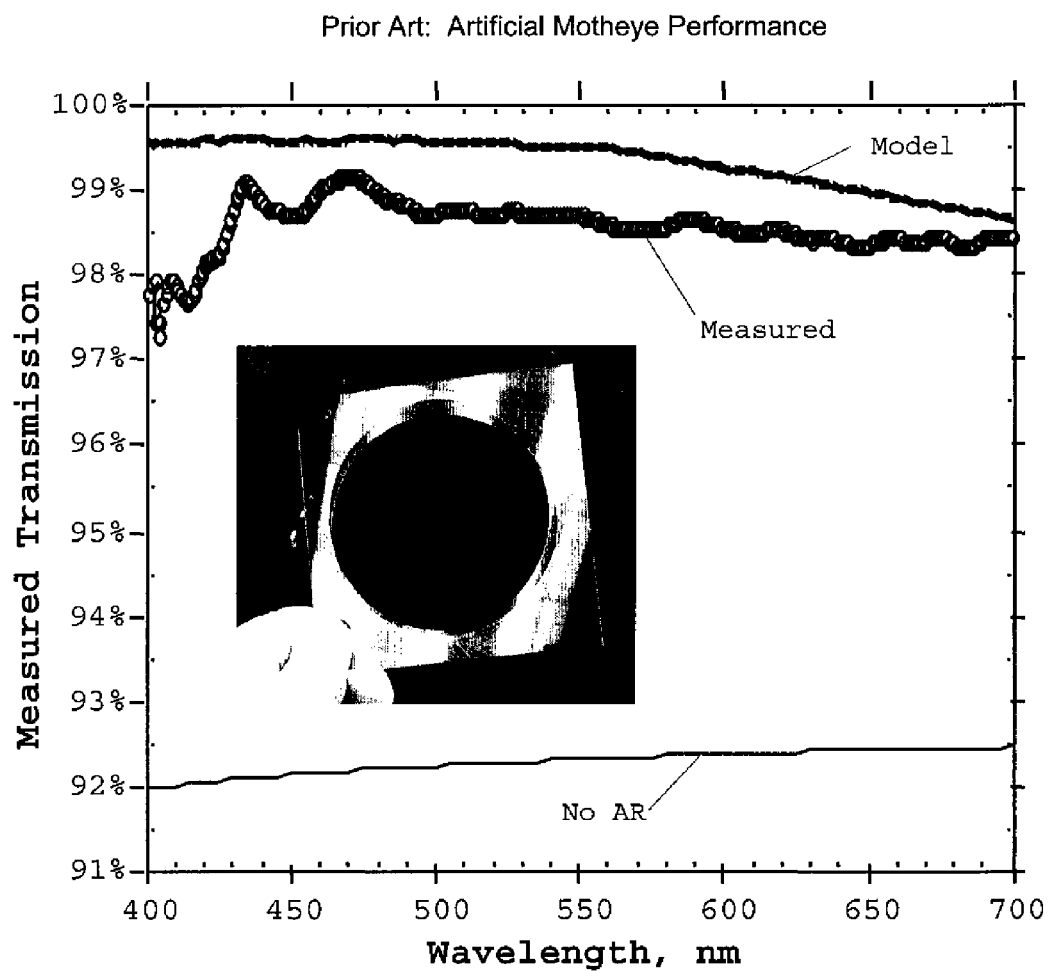
FIG. 2 is a plot of the transmission through a window containing prior art Motheye surface textures. An inset photograph shows an image of a Motheye textured window.

The measured transmission of a Motheye anti-reflection texture similar to that shown in FIG. 1, is shown in FIG. 2. Motheye textures have been replicated in a hardened polymer on both surfaces of a glass window. The transmission through the window is about 99% for most of the visible light spectrum from 400 to 700 nm. This compares favorably to the average 92% transmission of the glass window with no anti-reflection treatment, also shown in the figure. A theoretical model for the transmission through the Motheye textured window predicts a transmission closely matching the measured data, also shown in the figure. An image of the window in front of an evergreen tree is shown inset in the figure. Note that the evergreen tree cannot be observed in the region outside the circular area containing the Motheye textures due to the reflected image of the room overhead lighting fixture.

Figure 3A:
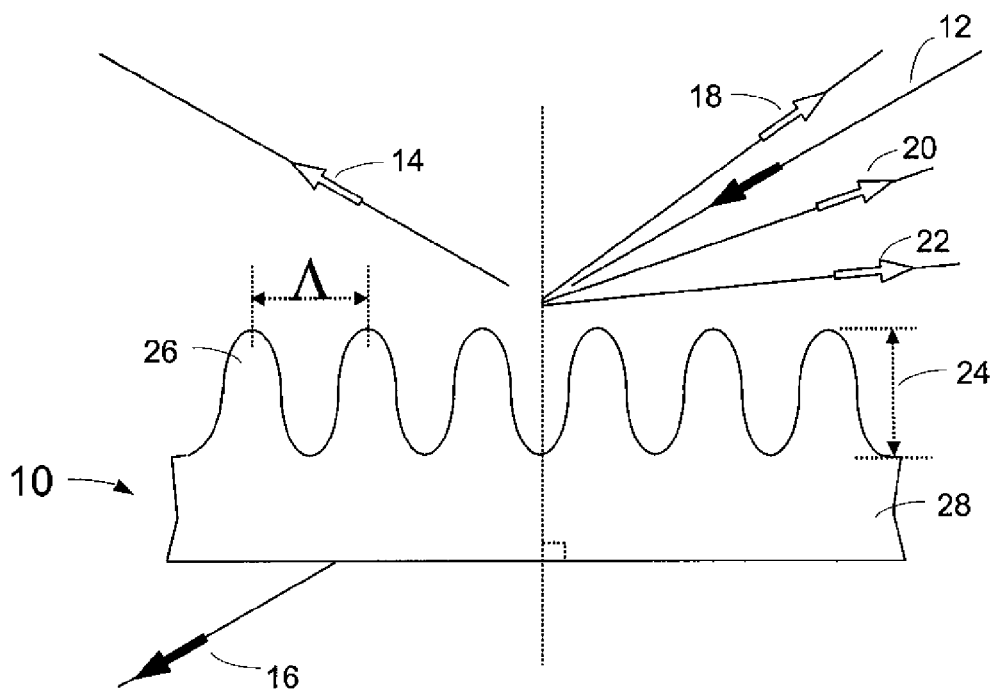
FIG. 3a is a schematic cross-sectional view of a prior art surface structure illuminated with light incident off the normal. A photograph of light diffracting from a Motheye surface texture is also shown as FIG. 3b.
Figure 3B:
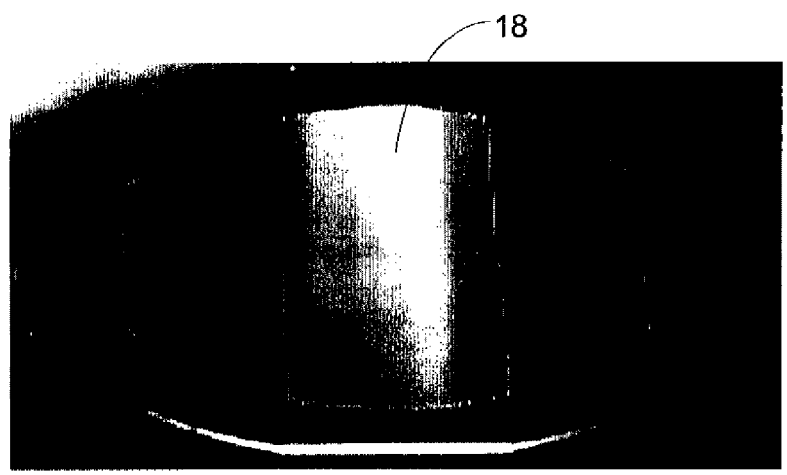

FIGS. 3a and 3b illustrate the problem of diffraction from the Motheye surface textures described in FIGS. 1 and 2. A cross sectional profile diagram of a portion of a Motheye texture 10 contains substrate 28 with surface relief texture 26, the surface relief texture having a sinusoidal profile in this case with a relief height 24 as shown. Illuminating light 12 containing a broad spectrum of light, is incident upon surface relief texture 26 at a sufficiently large angle to allow diffracted light 18, 20, and 22 to propagate in free space. Reflected light 14 is re-directed at an angle equal to the angle of incidence of illuminating light 12, and represents the zero order. Transmitted light 16 is displaced by refraction within substrate 26, but continues to propagate at the same angle as illuminating light 12. Diffracted light 18, 20, and 22 contain a narrow spectrum of light with 18 representing the longest wavelengths and 22 representing the shortest wavelengths that propagate in free space. This diffraction effect is well understood and is governed by the long established grating equation (See Hecht and Zajac, "Optics", Addison-Wesley publishing, 1974, page 357). In the case where $\Lambda$ is 250 nm, diffracted light 18, 20, and 22 will contain light in the blue range of the visible spectrum. The photograph of FIG. 3b shows an image of a Motheye texture master illuminated as shown in the diagram of FIG. 3a. Diffracted light 18, 20, and 22 is diffracted back toward the camera with great efficiency yielding a bright blue image of the illuminating source. The disclosed invention is intended to eliminate diffracted light 18, 20, and 22 while still providing the high performance anti-reflecting properties found with Motheye surface relief textures.

Figure 4:
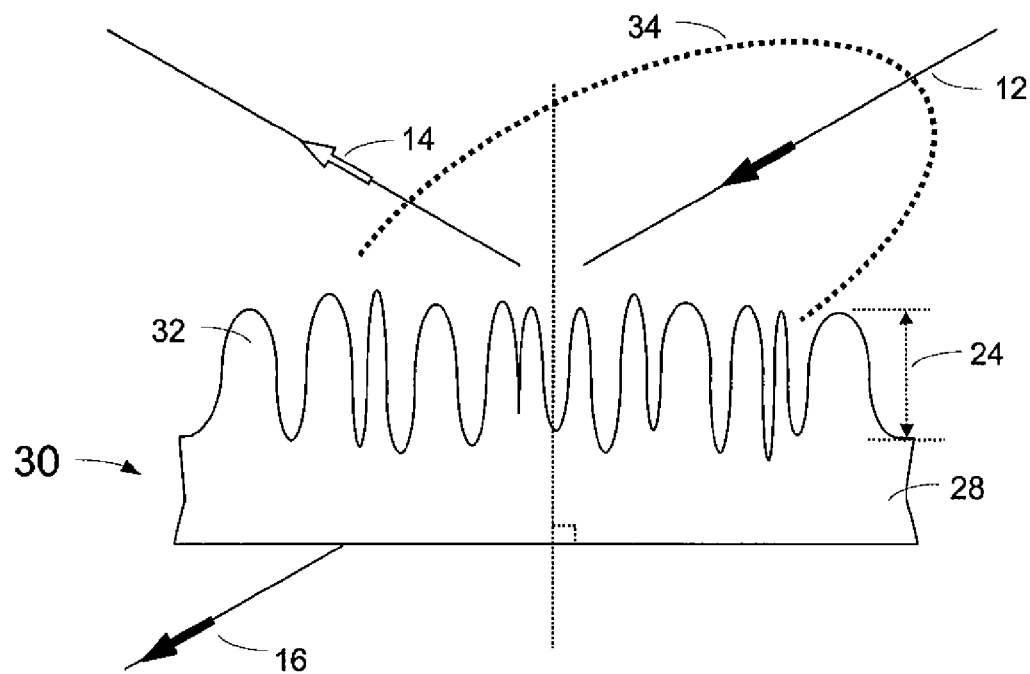
FIG. 4 is a schematic cross-sectional view of a random texture anti-reflection surface relief structure according to certain principles of the present invention.

FIG. 4 illustrates a cross sectional profile diagram of a portion of an inventive surface relief texture 30 containing substrate 28 with surface relief structures 32. The surface relief structures may either protrude from the substrate as generally conical features, or they may be the inverse (generally V-shaped grooves or holes in the substrate surface). As with FIG. 3, illuminating light 12 containing a broad spectrum of light, is incident upon surface relief texture 30 at a large angle, reflected light 14 is re-directed at an angle equal to the angle of incidence of illuminating light 12, and transmitted light 16 is displaced by refraction within substrate 26, but continues to propagate at the same angle as illuminating light 12. Surface relief texture 30 contains surface relief structures 32 distributed randomly with a structure spacing no greater than the shortest wavelength contained in illuminating light 12. The height of surface relief structures 32 is not less than 40 percent of the longest wavelength contained in illuminating light 12. The height and spacing of the structures ensures the sufficiently gradual change in the surface density needed to provide effective suppression of reflected light. Because the structures have a random distribution of depth and spacing, the constructive interference due to multiple reflections from a highly periodic structure such as with the Motheye textures in FIG. 3, is not supported. Only scattered light 34 is possible with this random distribution of surface features. For applications such as eyeglasses and display covers, a small amount of scattered light outside the viewing zone is preferable over the bright blue and green diffracted light observed with typical Motheye anti-reflection textures.

For visible light applications, the preferred materials for substrate 28 containing surface structures 32 are glass and plastic, but can be other materials such as sapphire, quartz, fused silica, zinc sulfide, zinc selenide, calcium fluoride, or potassium bromide. Some semiconductor materials used in solar cells and visible light detectors, such as silicon, gallium arsenide, and germanium may also be used.

For infrared light applications, the preferred materials for substrate 28 containing surface structures 32 are fused silica and other infrared transmitting glasses, yittria, yttrium aluminum garnet (YAG), sapphire, zinc sulfide, zinc selenide, calcium fluoride, potassium bromide, silicon, gallium arsenide, cadmium telluride, and germanium.

Figure 5:
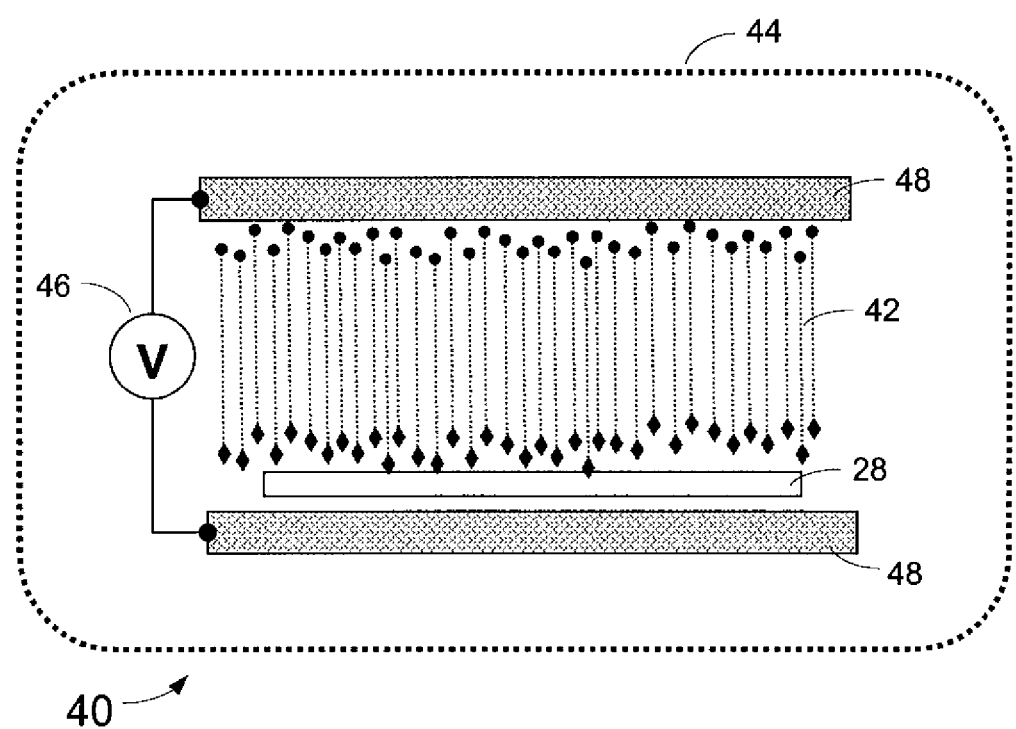
FIG. 5 is a schematic representation of a fabrication process to produce a random texture anti-reflection surface relief structure according to certain principles of the present invention.

A particular advantage of the disclosed invention is that the random surface textures can be fabricated without the lithography processes needed for Motheye textures. FIG. 5 shows a cross sectional view of an apparatus used to directly etch the random surface textures into the substrate layers. The technique depicted in FIG. 5 is known in the art as reactive ion etching, or RIE. The RIE system 40 consists of plate electrodes 48 contained within chamber 44. The substrate to be etched 28 is first placed between electrodes 48. A vacuum is created within chamber 44 using a pump system. Next a flow of a gas 42 capable of chemically etching the substrate material is introduced into the chamber and an electric potential 46 is applied across the plate electrodes 48, creating a positive cathode and negative anode. The gas 42 is ionized by the electric potential and a plasma is formed where the ionized particles in the gas plasma are accelerated toward the cathode upon which the substrate 28 is located. Surface etching takes place as both a chemical attack and physical bombardment of the substrate material.

With typical glass and plastic substrate materials, the composition and density of the material varies randomly on a microscopic level, particularly at the surface. The gas plasma will selectively etch the surface in a manner that matches this random distribution. In addition, exposing a material to the gas plasma allows the formation of carbon, fluorine, oxygen and other material polymers that can form at random locations on the surface of the material and at random times. These polymers can persist for a random amount of time masking the removal of material at that location. The balance between this micromasking and material removal is used to vary the nature of the resulting surface texture. The preferred reactive gas composition for etching random textures in glass or plastic is tri-fluoromethane (CHF3) alone or in combination with oxygen and/or argon. CHF3 has been found to yield the highest density of features with the least amount of undercutting to allow for pattern replication.

Other gases that chemically attack substrate materials and thus are useful for creating random texture surface relief structures include: methane (CH4), hydrogen (H2), bromotrifluoromethane (CBrF3), carbon tetrafluoride (CF4), oxygen, sulfur hexafluoride (SF6), and chlorine based gases such as silicon tetrachloride (SiCl4) and boron tri-chloride (BCl3).

Figure 6:
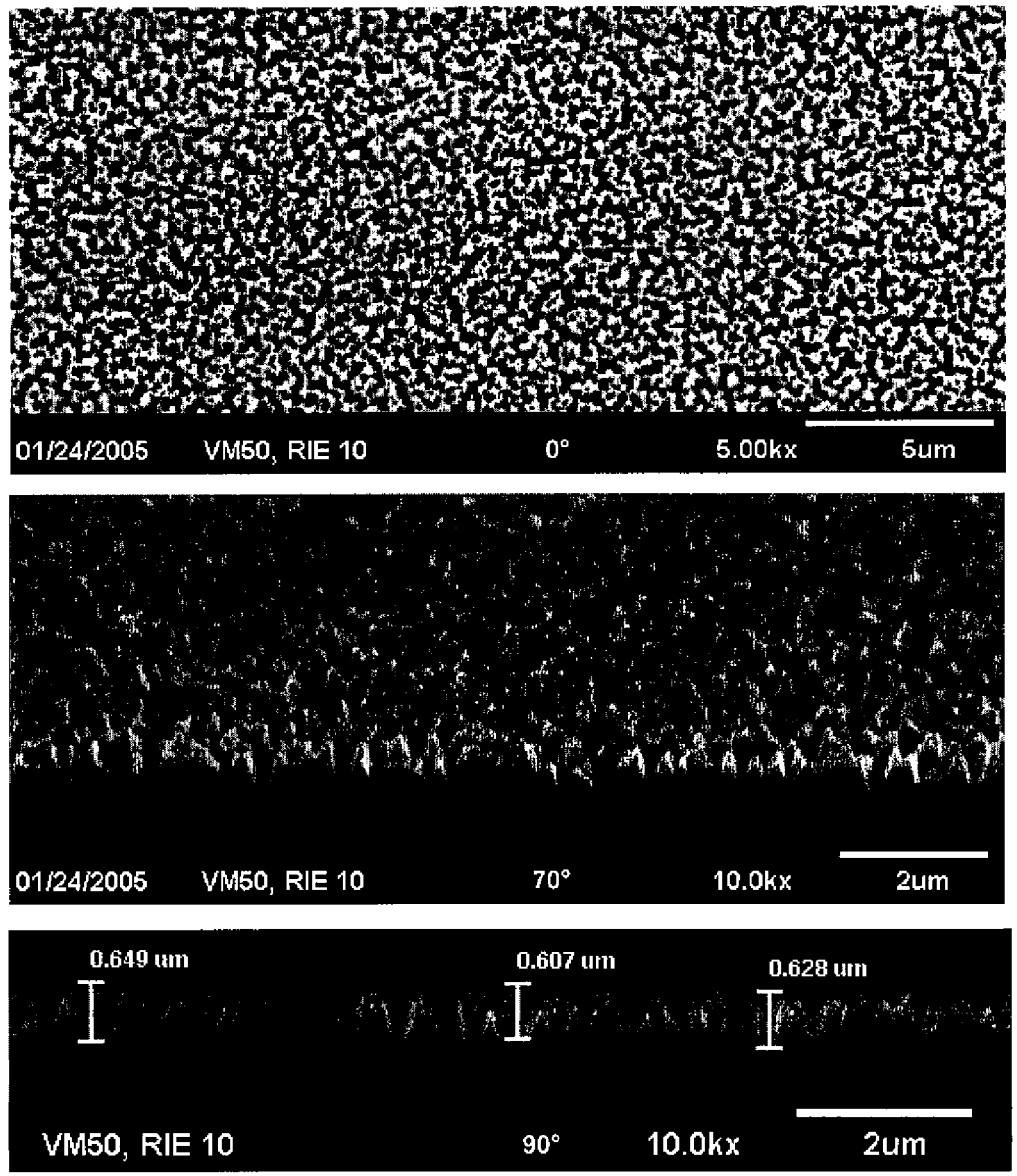
FIG. 6 shows micrographs of a random texture anti-reflection surface relief structure fabricated in a glass window according to certain principles of the present invention.

FIG. 6 shows SEM images of a random texture etched in the surface of an inexpensive borosilicate float glass made by Schott Corporation (Schott Borofloat 33). Overhead (0°), elevation) (70° and profile (90°) views of the fabricated microstructure are shown. CHF3 in combination with oxygen at a mix ratio of 7 parts CHF3 to 1 part oxygen was used to define the texture. On average the texture depth is 630 nm and the largest features have a maximum dimension of about 700 nm. This texture exhibits exceptional anti-reflection properties for near infrared light in the range of from 800 to 2000 nm. Visible light scattering limits its use to the infrared, with the exception that applications such as night vision equipment, security labels, and infrared tags or beacons would gain a measure of visible light stealth when combined with infrared transmitting—visible light absorbing materials. Note that the profile of the features is in general parabolic or cup-shaped. This type of feature is readily replicated into plastic.

Figure 7:
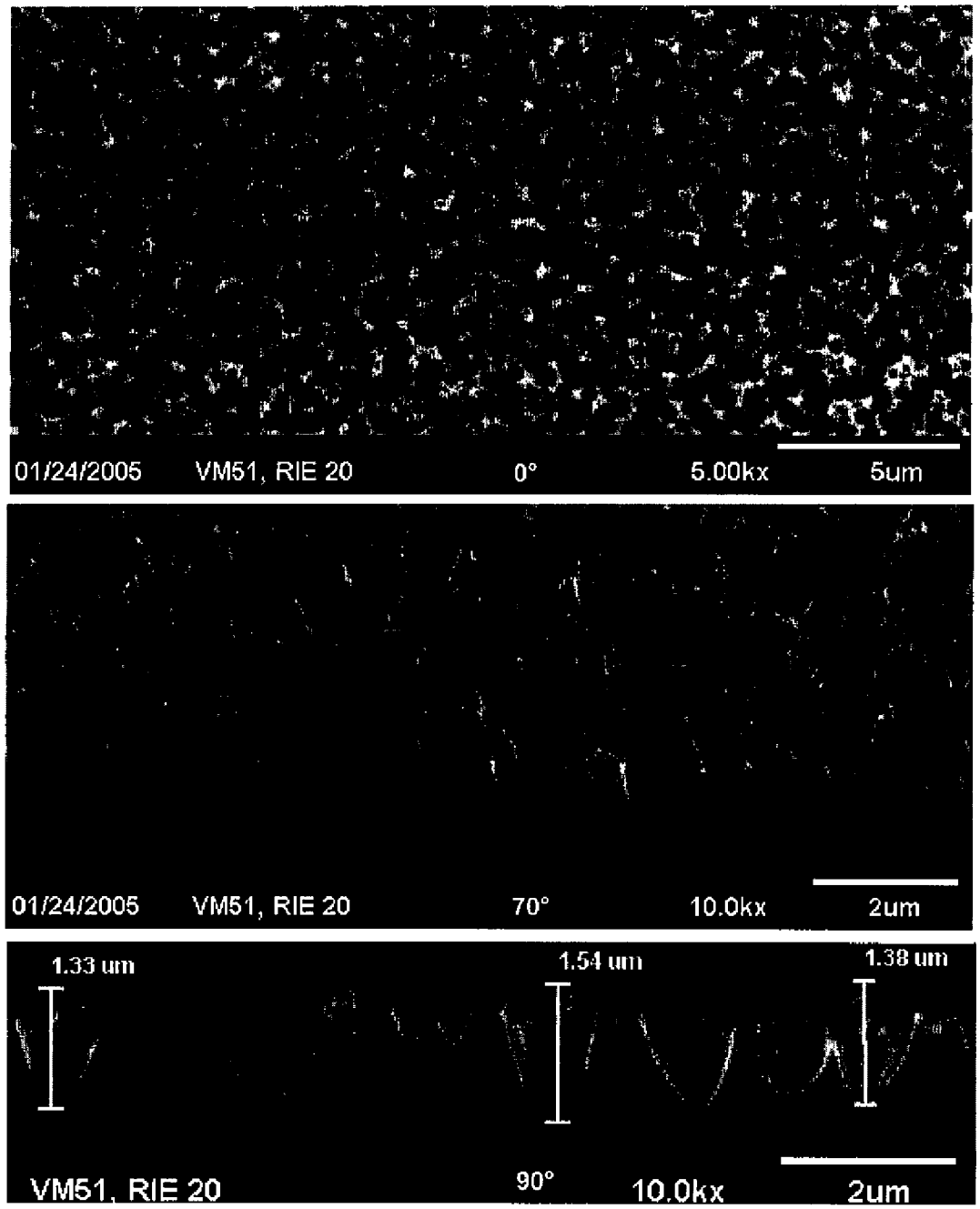
FIG. 7 shows micrographs of a random texture anti-reflection surface relief structure fabricated in a glass window according to certain principles of the present invention.

FIG. 7 shows SEM images of another random texture also etched in the surface borosilicate float glass. Again, overhead)

(0°, elevation (70°) and profile (90°) views of the fabricated microstructure are shown. As with the structures shown in FIG. 6, CHF3 in combination with oxygen was used to define the texture. The etch parameters such as electric potential, gas flow, and gas mixing ratio, were set the same as the setting used to create the texture shown in FIG. 6, except that the etch time was doubled from 10 minutes with the FIG. 6 texture, to 20 minutes for the FIG. 7 texture. The texture depth has increased to over 1500 nm and the largest feature size has increased to over 1000 nm. This texture fabricated in a sapphire substrate would work well over the mid-infrared range of from 2500 to 6000 nm.

Mixing ratios of CHF3:O2 from 1:1 to 10:1 have been tested, with 7:1 found to date as preferred. CHF3:Ar ratios of 7.5:1 and 10:1 have been tried, as have mixtures of CHF3:CF4:O2.

Figure 8:
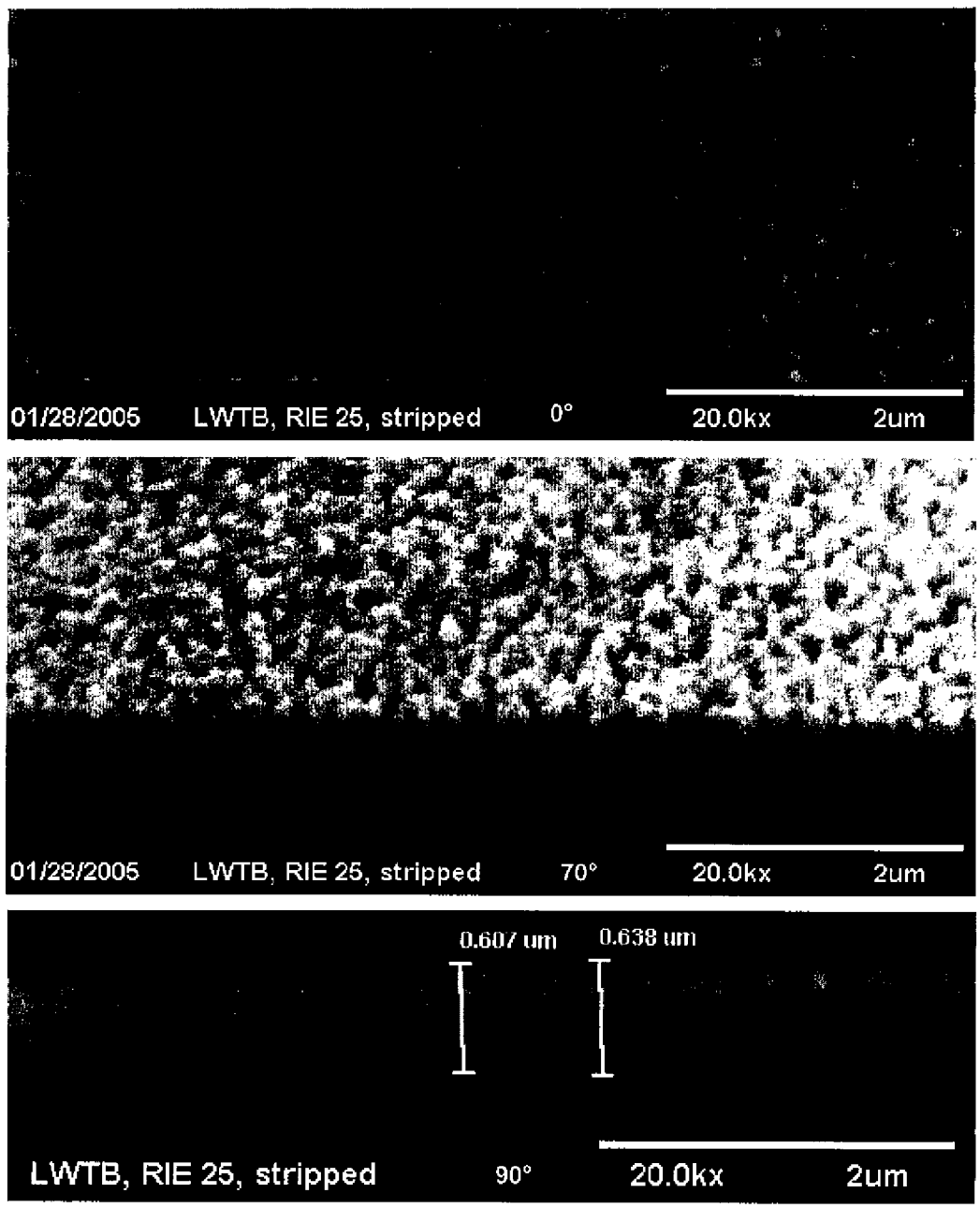
FIG. 8 shows micrographs of a random texture anti-reflection surface relief structure fabricated in a glass window according to certain principles of the present invention.

FIG. 8 shows the effect of adjusting the gas mixing ratio on the resulting surface relief texture fabricated in borosilicate glass. The proportion of oxygen in the CHF3:O2 mixture was reduced by a factor of 5. The texture density has increased by about a factor of 4 (note the scale change) over the FIG. 7 results. The average texture depth is about 615 nm. This texture performs well as an anti-reflection surface for most of the visible range and into the near infrared. Some scatter remains at short wavelengths in the visible giving the window a smoky blue appearance when viewed at an angle.

Figure 9:
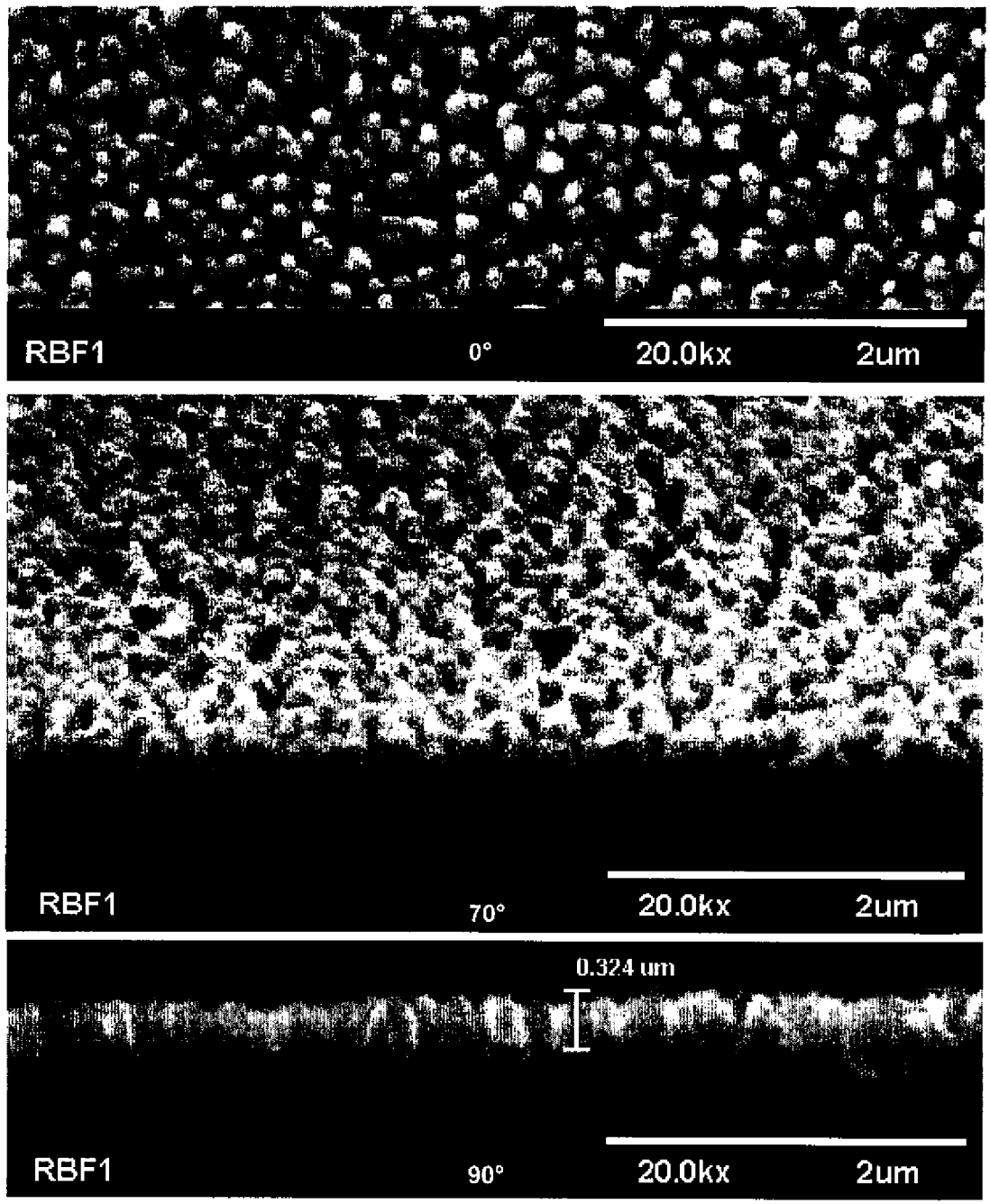
FIG. 9 shows micrographs of a random texture anti-reflection surface relief structure replicated in a plastic window according to certain principles of the present invention.
Figure 10A:
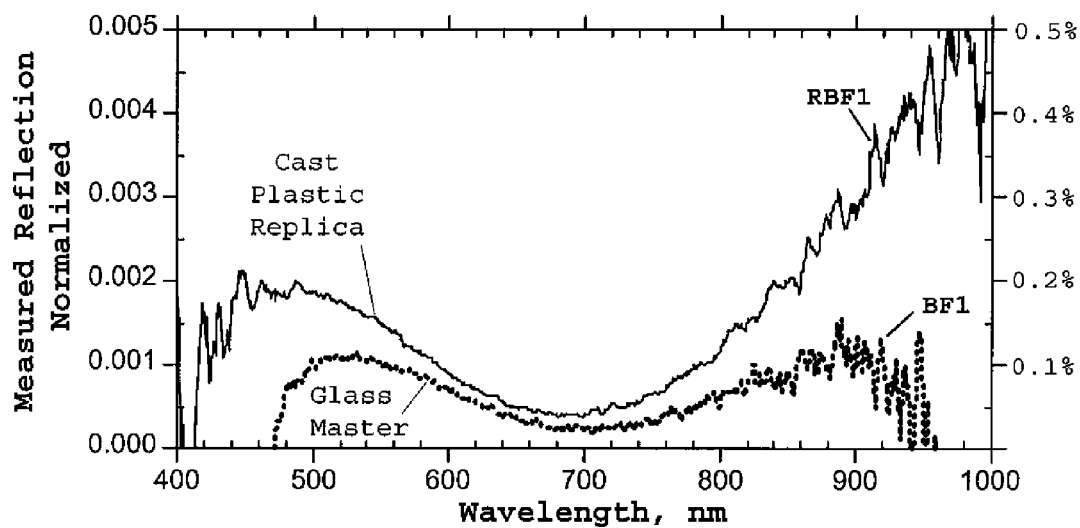
FIG. 10a is a plot of the reflection from windows such as the one shown in FIG. 9 containing random texture anti-reflection surface relief structures according to certain principles of the present invention.

The scattered light in the blue found with the FIG. 8 textures is eliminated by reducing the etch time to yield a maximum feature size of less than 200 nm and a feature depth of just over 300 nm. The fabricated texture was then employed as a master mold to cast a plastic replica into a custom formulated scratch resistant polymer resin used in the manufacture of eyeglasses. The resin was provided by Spectra Group Limited of Ohio. The replicated texture is shown in FIG. 9. FIG. 10a shows a measurement of the amount of light reflected by the surface texture as a function of wavelength over the visible and near infrared range. The measurement was made using a fiber-coupled grating based spectrometer. The dashed line shows the reflection from the glass master texture and the solid line shows the reflection of the plastic replica. In both cases the measured reflection is less than two tenths of one percent over the entire visible range from 400 to 700 nm. The largest amount of reflected light occurs in the blue due to the scattered light.

Figure 10B:
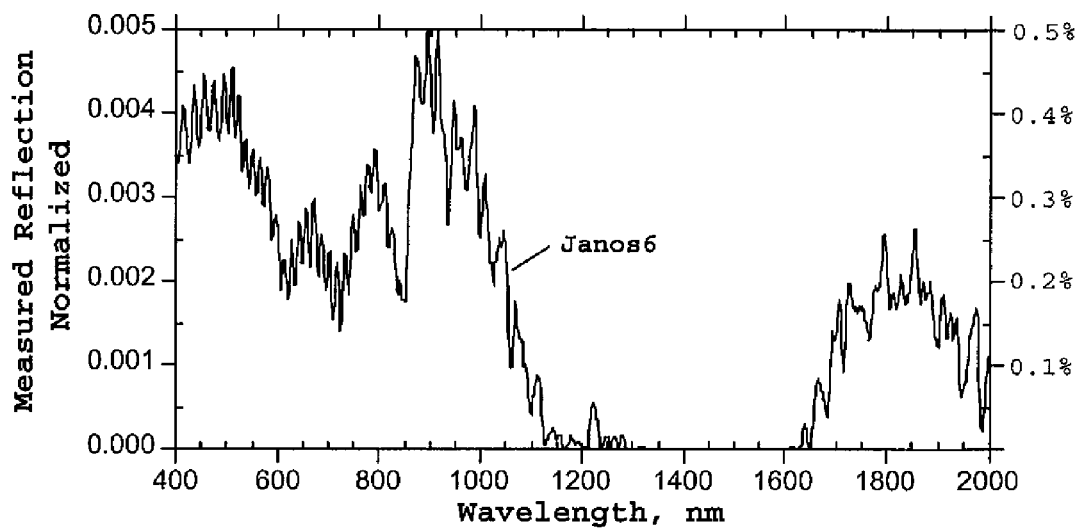
FIG. 10b is a plot of the reflection from a window such as the one shown in FIG. 8 containing random texture anti-reflection surface relief structures according to certain principles of the present invention.

In FIG. 10b the reflection of light from one surface of a random texture similar to that shown in FIG. 8 etched in a glass window, is shown for a wide range of wavelengths spanning the visible and near infrared bands. The data was taken by Janos Technologies of New Hampshire using their in-house FTIR spectrometer. Note that the reflectance is below 0.4% over a 1600 nm (4 octave) range. Such AR performance has great utility for many sensor and imaging applications that require the suppression of stray light reflections.

Figure 11:
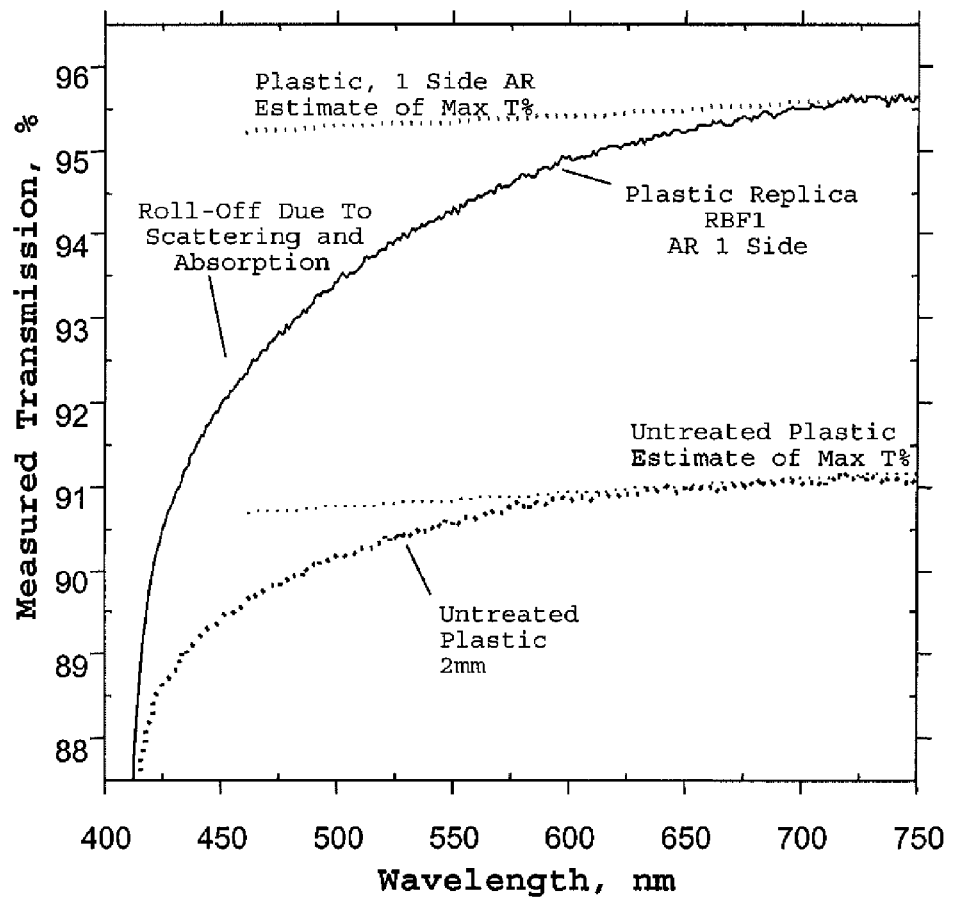
FIG. 11 is a plot of the transmission through a plastic window containing a random texture anti-reflection surface relief structures according to certain principles of the present invention.

The transmission of light through the FIG. 9 random textured plastic window is shown in FIG. 11. Here the effects of light scattering in the blue are evident. About one percent of the light transmitted in the blue is lost to scattering. Note that the plastic window begins to absorb light in the blue and becomes completely opaque at 400 nm, cutting off all UV light—a requirement of the eyeglass application. At wavelengths longer than 450 nm, the transmission through the plastic window is increased by 4.5% over an untreated plastic window, the maximum amount attainable with no reflection losses from one surface.

Figure 12:
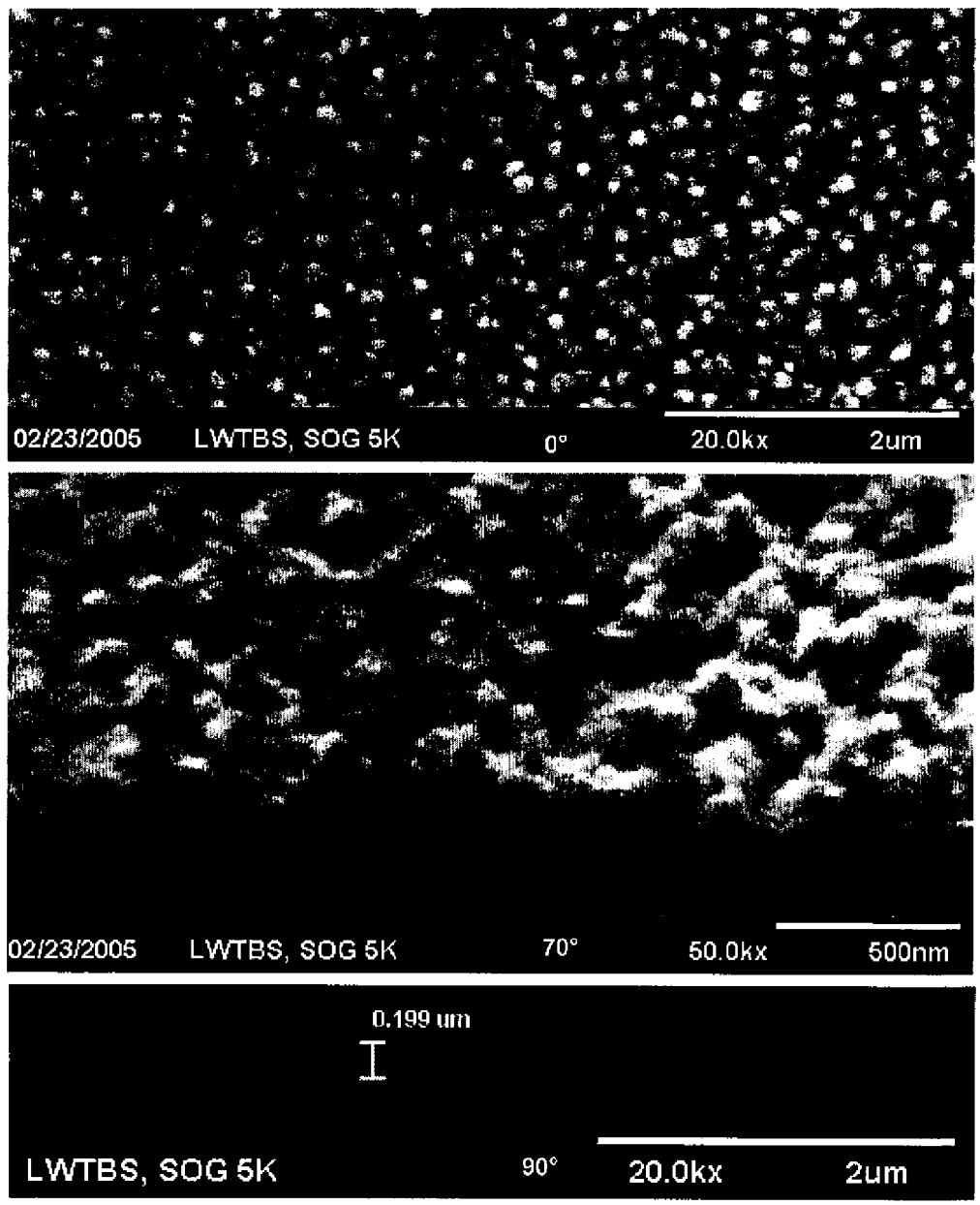
FIG. 12 shows micrographs of a random texture anti-reflection surface relief structure fabricated in a glass window according to certain principles of the present invention.

For applications where scattered light is a problem, the random surface textures can be modified by a variety of means including additional etching and the deposition of additional materials. FIG. 12 shows the random texture of FIG. 8 after depositing a glass bearing polymer material, a spin-on glass material manufactured by Honeywell termed "SE111" using a spin coating process. Once deposited, the spin-on-glass material is heated to 400 C to drive off all the solvents and remove as much of the polymer material as possible. The resulting texture has been reduced in depth by a factor of 3 to just 200 nm. The maximum feature size was dropped in half to about 180 nm, which reduced the light scattering in the blue to levels which could not be measured. A similar result would be found using other materials and processes such as evaporating a thin layer of silica ($SiO_2$).

Figure 13:
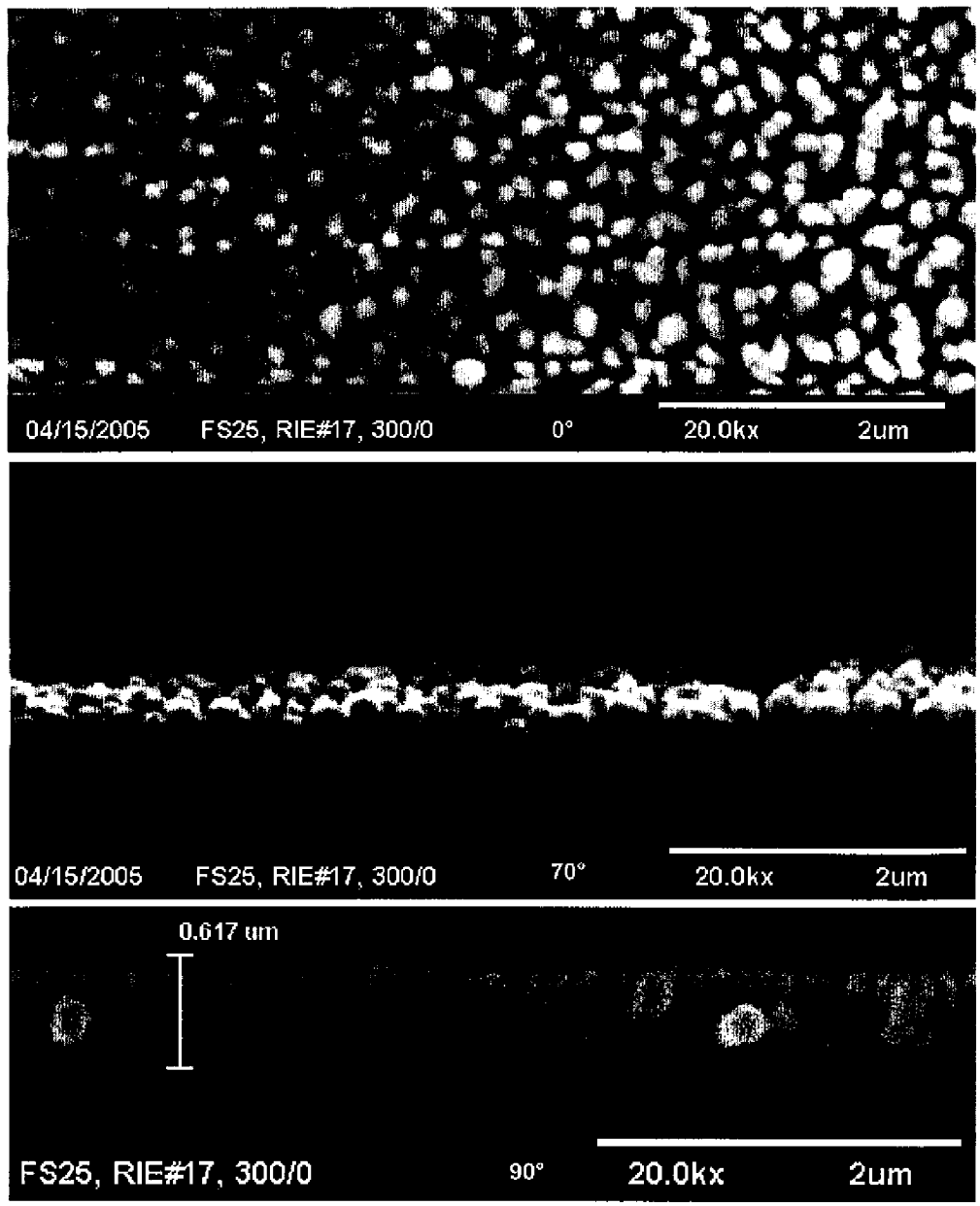
FIG. 13 shows micrographs of a random texture anti-reflection surface relief structure fabricated in a fused silica window according to certain principles of the present invention.
Figure 14:
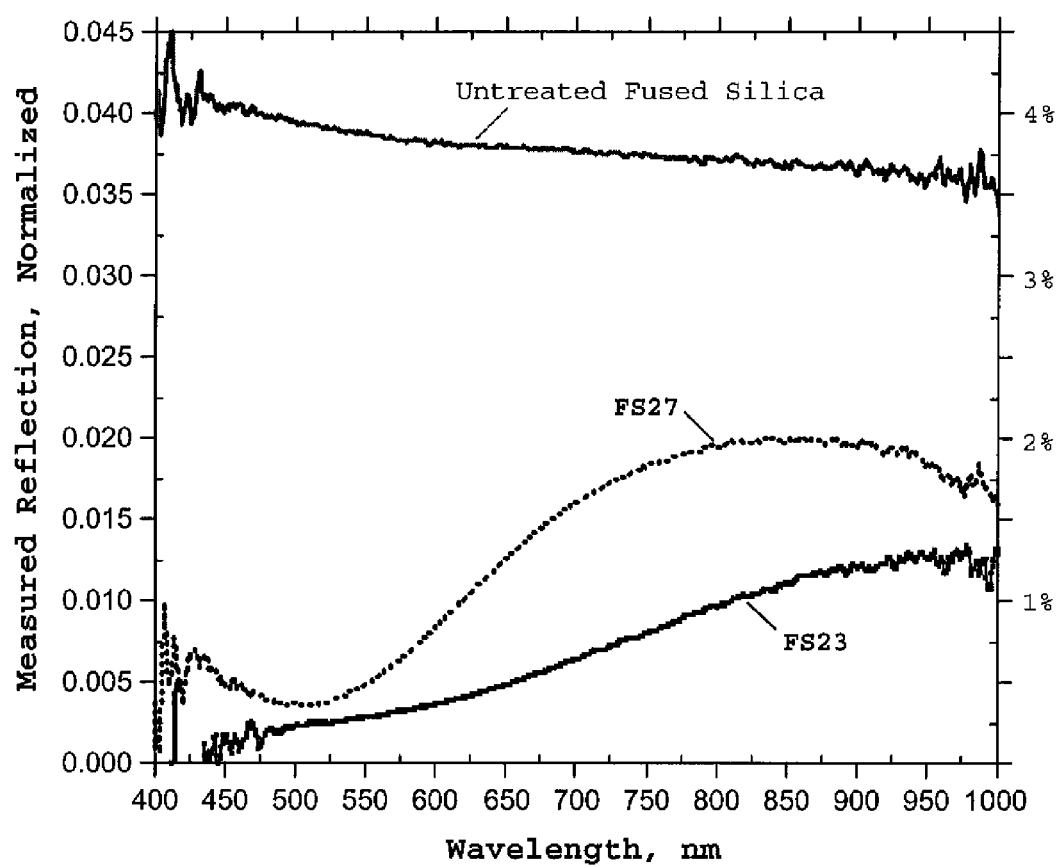
FIG. 14 is a plot of the transmission through a fused silica window containing a random texture anti-reflection surface relief structures according to certain principles of the present invention.

The disclosed invention and fabrication process can be realized in a variety of substrate materials. FIG. 13 shows SEM micrographs of a random texture etched in the surface of a fused silica window intended for applications in the near infrared and at the atmospheric infrared window at 3200 nm. The RIE parameters, such as gas composition and gas mixing ratio, were varied to alter the character of the etched surface to match the application requirements. FIG. 14 shows the measured reflection of light through fused silica windows similar to the FIG. 13 window. As noted above, the AR performance was adjusted by varying the RIE etch parameters. Prototype window #FS23 has been optimized for good AR performance over the visible light spectrum showing an average reflection of less than 0.5%.

Figure 15:
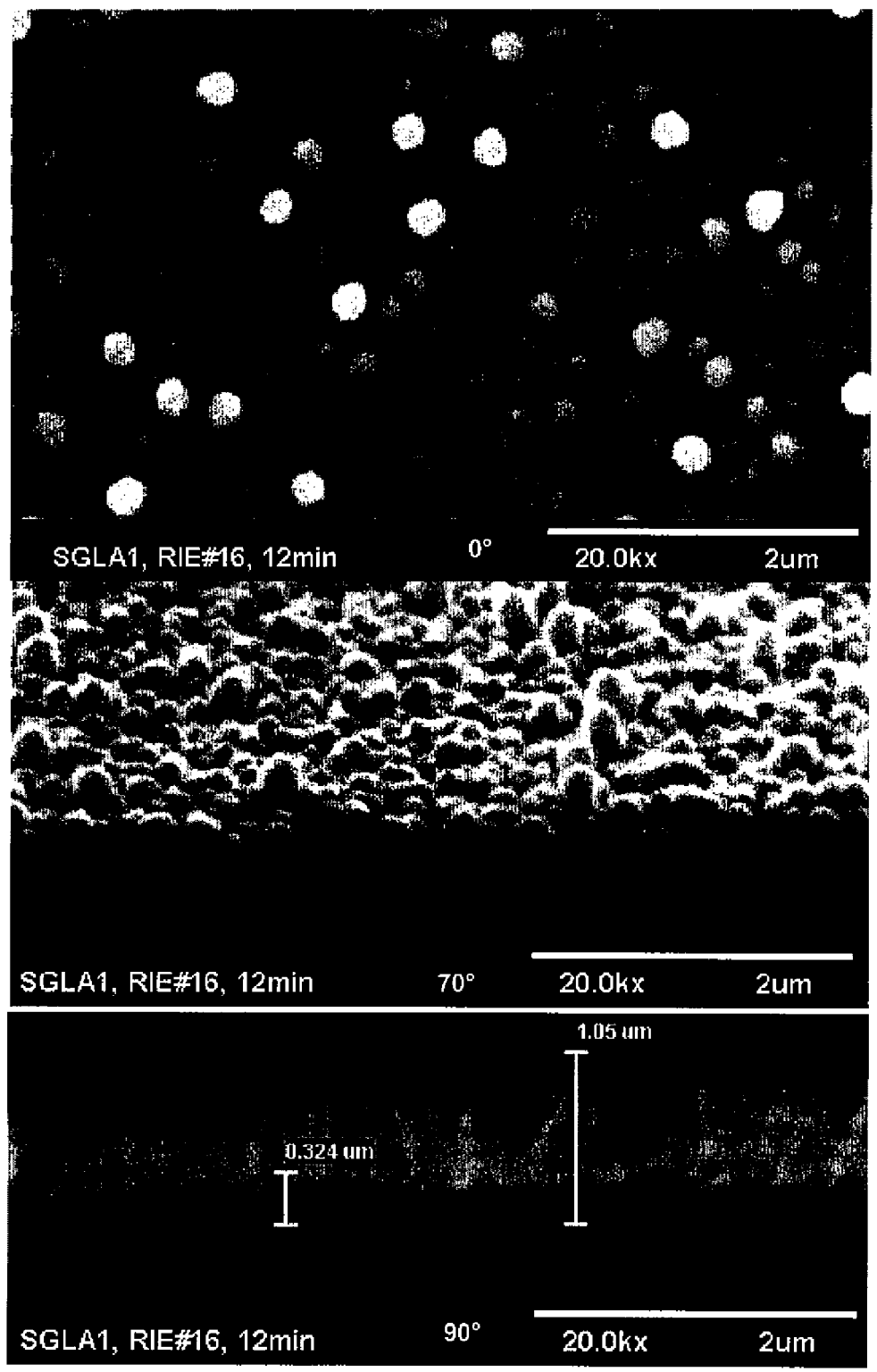
FIG. 15 shows micrographs of a random texture anti-reflection surface relief structure fabricated in a plastic window according to certain principles of the present invention.
Figure 16:
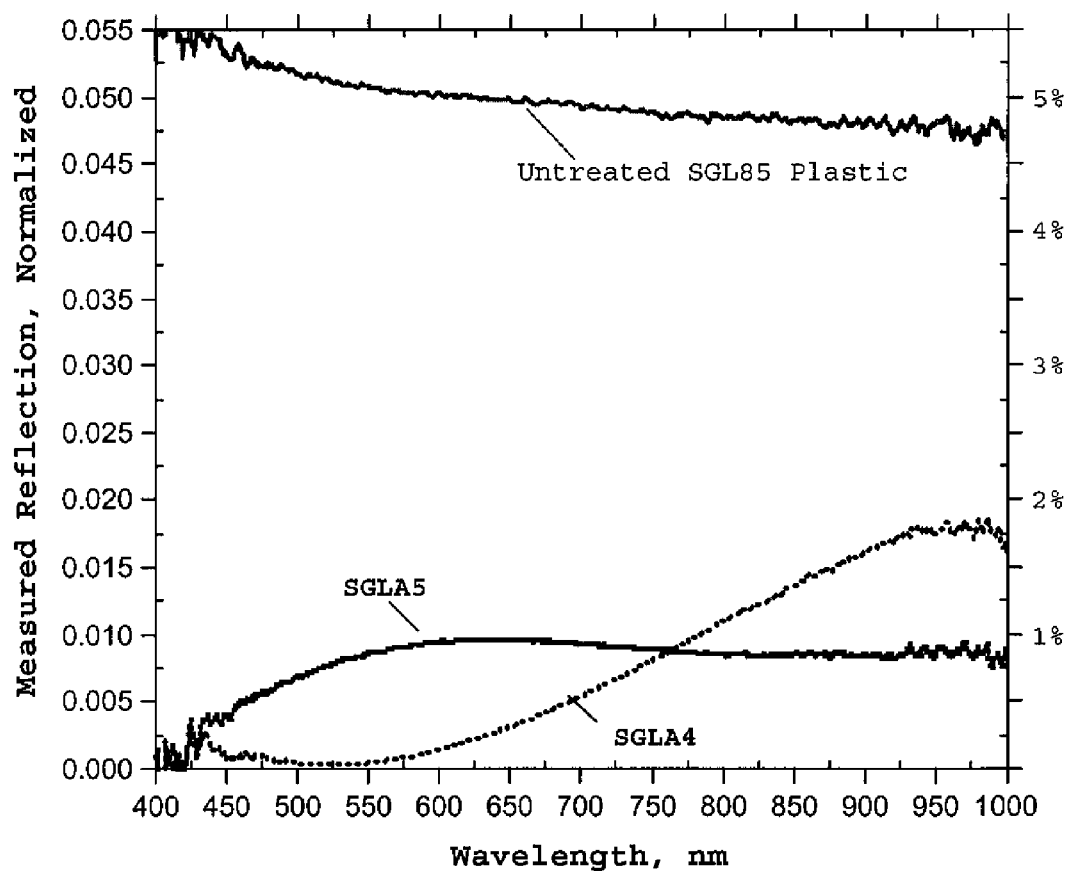
FIG. 16 is a plot of the transmission through a plastic window containing a random texture anti-reflection surface relief structures according to certain principles of the present invention.

FIG. 15 shows SEM micrographs of a random texture etched directly into the surface of a plastic window intended for application as a mobile phone display cover. The plastic resin used was again the scratch and impact resistant polymer mentioned above and used for fabricating eyeglasses. Random textures were readily produced using the same RIE gas composition and parameters as those used to fabricate the glass texture of FIG. 8. FIG. 14 shows the measured reflection of light from plastic windows similar to the FIG. 15 window. Again the AR performance was adjusted by varying the RIE etch parameters. Prototype window #SGLA4 has been optimized for exceptional AR performance over the visible light spectrum showing an average reflection of less than 0.3%. Prototype SGLA5 was fabricated with deeper structures to produce good AR performance over a broader wavelength band. Note that the reflectance of SGLA5 is nearly constant over the 500 to 1000 nm range giving the window a neutral grey appearance when viewed against a black background.

Figure 17:
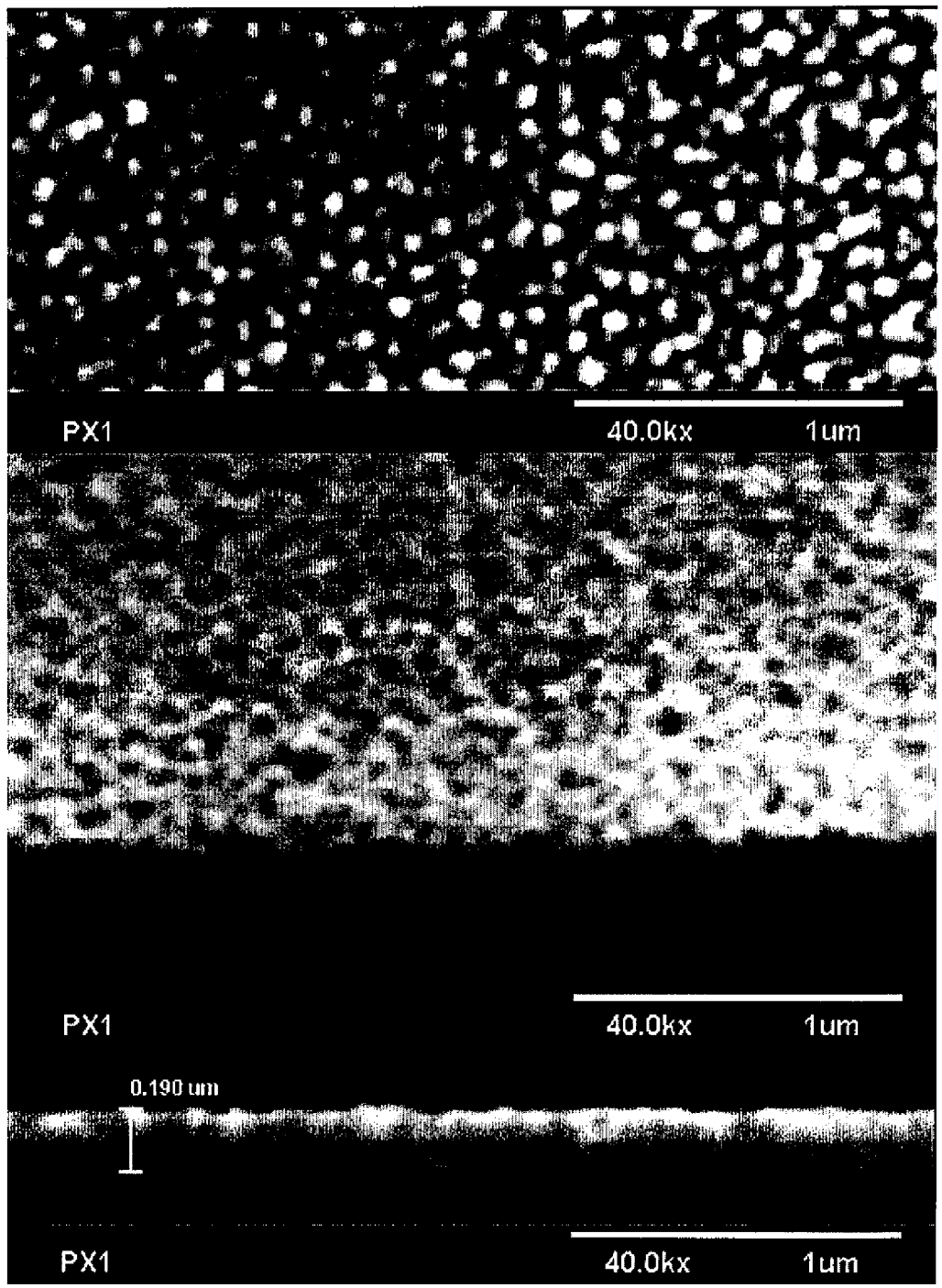
FIG. 17 shows micrographs of a random texture anti-reflection surface relief structure fabricated in a pyrex glass lens mold according to certain principles of the present invention.

For the eyeglass application, plastic lenses with any given prescription can be fabricated by a casting process whereby a liquid plastic injected between glass lens molds is hardened by exposure to UV light or by heating. The disclosed random texture AR structures can be readily fabricated in the surface of a glass mold with any given curvature by a simple change to the RIE configuration shown in FIG. 5. For example, the cathode or anode electrode 48 in FIG. 5 can be re-shaped as a hemispherical surface with a curvature that is similar to, but not necessarily the same as, the glass lens mold. In this way the electric field lines are made to terminate on the bottom electrode such that they are everywhere perpendicular to the surface of the glass lens. FIG. 17 shows SEM images of a random texture etched in the surface of an 80 mm diameter Pyrex glass lens mold using a custom hemispherical bottom electrode with a curvature similar to the lens mold. Overhead (0°), elevation (70°) and profile (90°) views of the fabricated microstructure are shown. A gas mixture of CHF3:O2 in the ratio of 7:1 was employed. Note that the resulting texture is quite similar to that found with the flat windows and shown in FIGS. 8, 13 and 15.

Figure 18:
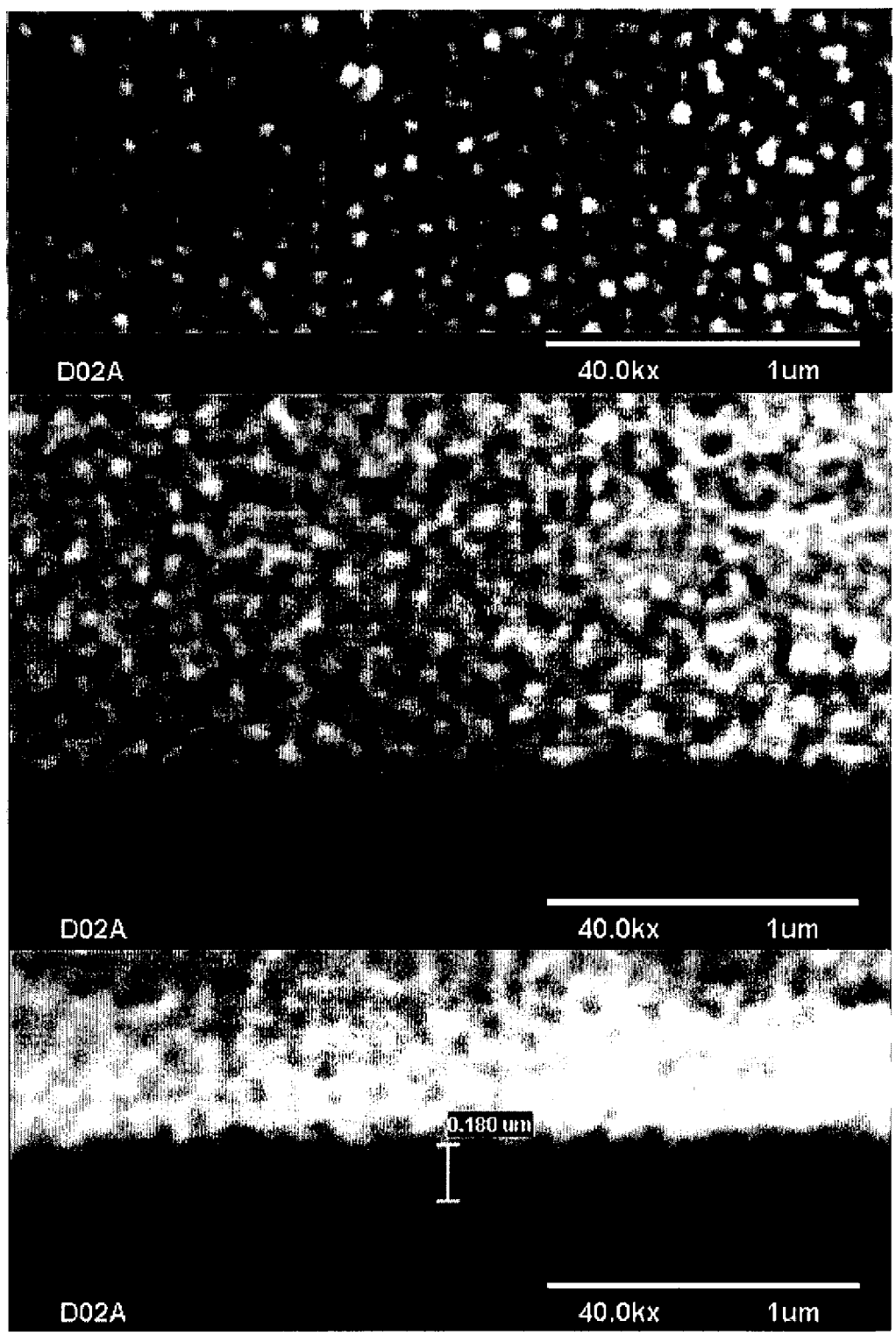
FIG. 18 shows micrographs of a random texture anti-reflection surface relief structure fabricated in a DURAN glass tube according to certain principles of the present invention.

Another fabrication technique important in the high volume replication of AR microstructures on plastic sheet film is the use of a cylindrical roller to produce a continuous, unbroken pattern on a roll of film often many thousands of feet long. The disclosed random texture AR treatment can be applied to the surface of a glass rod or tube that can serve as a master roller tool. As with the glass lens application, the RIE electrode configuration is adapted to etch the curved surface of the glass rod or tube. For example the flat electrodes 48 of FIG. 5 can be replaced by cylindrical electrodes with a radius of curvature that is similar to the glass rod or tube. FIG. 18 shows SEM images of a random texture etched in the surface of a 25 mm diameter, 150 mm long borosilicate glass tube made by Schott Corporation (DURAN). The tube was etched using a custom hemispherical cross-section metal rod inserted inside the tube and connected to the bottom electrode. Overhead (0°), elevation) (70° and profile (90°) views of the fabricated microstructure are shown. A gas mixture of CHF3:O2 in the ratio of 7:1 was again employed. Note that the resulting texture is quite similar to that of the flat windows shown in FIGS. 8, 13 and 15. Using this etch technique, it is possible to fabricate a continuous texture over the entire circumference of the glass rod or tube, yielding an unbroken or seamless roller.

With electronic cameras and sensors, an effective AR treatment is critical for suppressing stray light that can produce noise on the detected image. In addition, the sensitivity of the imaging sensor is greatly improved by eliminating losses due to light reflecting from the sensor surface. In much the same way, the power output of solar cells can be increased when reflections are eliminated. Many cameras and solar cells are based on silicon material that absorbs visible and near infrared light and in turn generates an electrical current. Silicon is highly reflective with no AR treatment, reflecting as much as 40% of the incident light, leaving only 60% to be converted to electrons. Conventional Motheye AR textures could eliminate the high reflections but are difficult and expensive to fabricate on silicon detector arrays or solar cells because of the lithography required. These obstacles are removed by the random texture AR treatment disclosed. In the case of silicon cameras, a direct RIE process using equipment already in place with standard silicon chip foundries, can be employed to produce a superior performance AR treatment with costs that are no greater than the costs associated with conventional thin-film AR coatings. With silicon-based solar cells, roll to roll replication using the seamless roller described above can yield the low cost fabrication needed.

Figure 19:
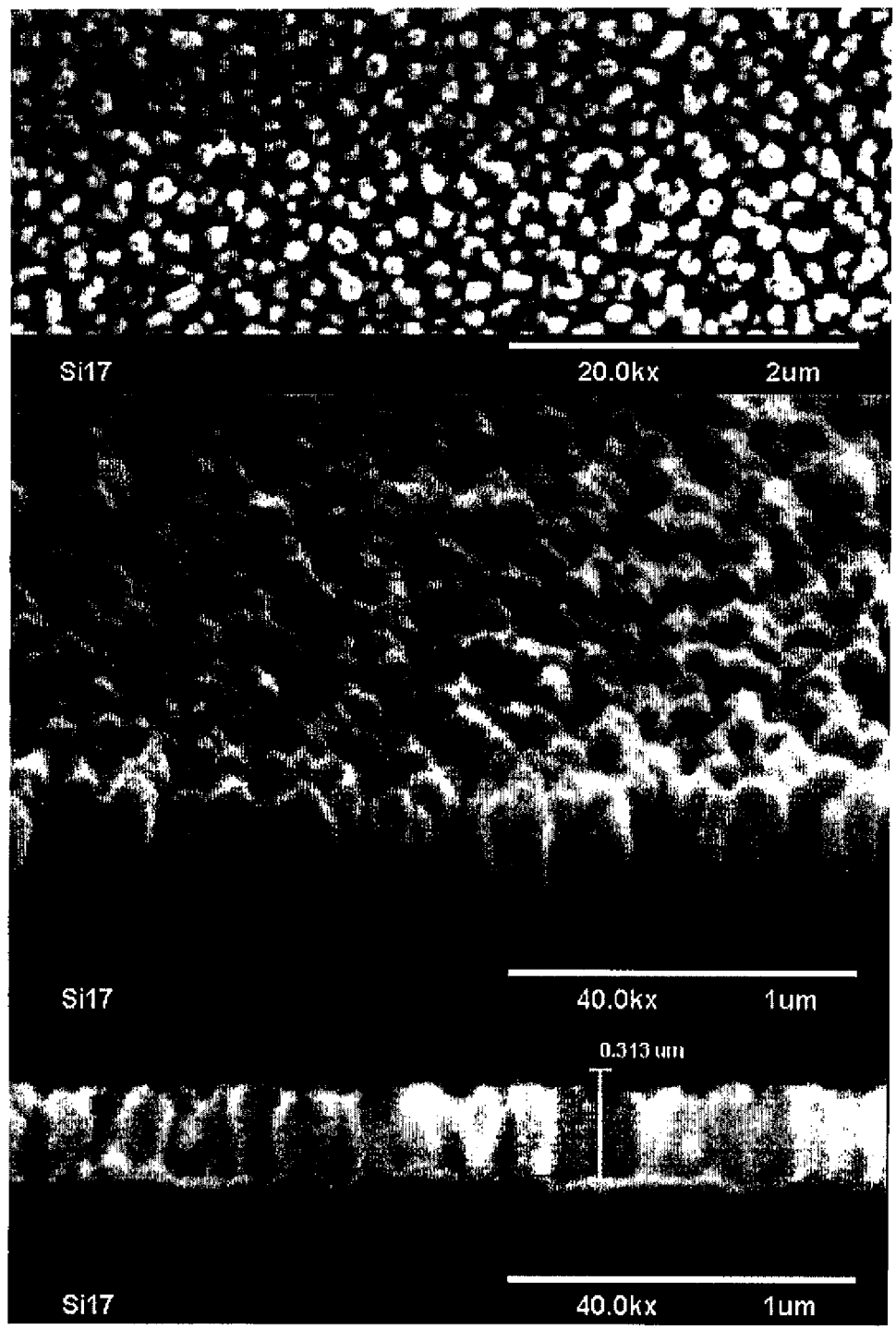
FIG. 19 shows micrographs of a random texture anti-reflection surface relief structure fabricated in a silicon window according to certain principles of the present invention.
Figure 20:
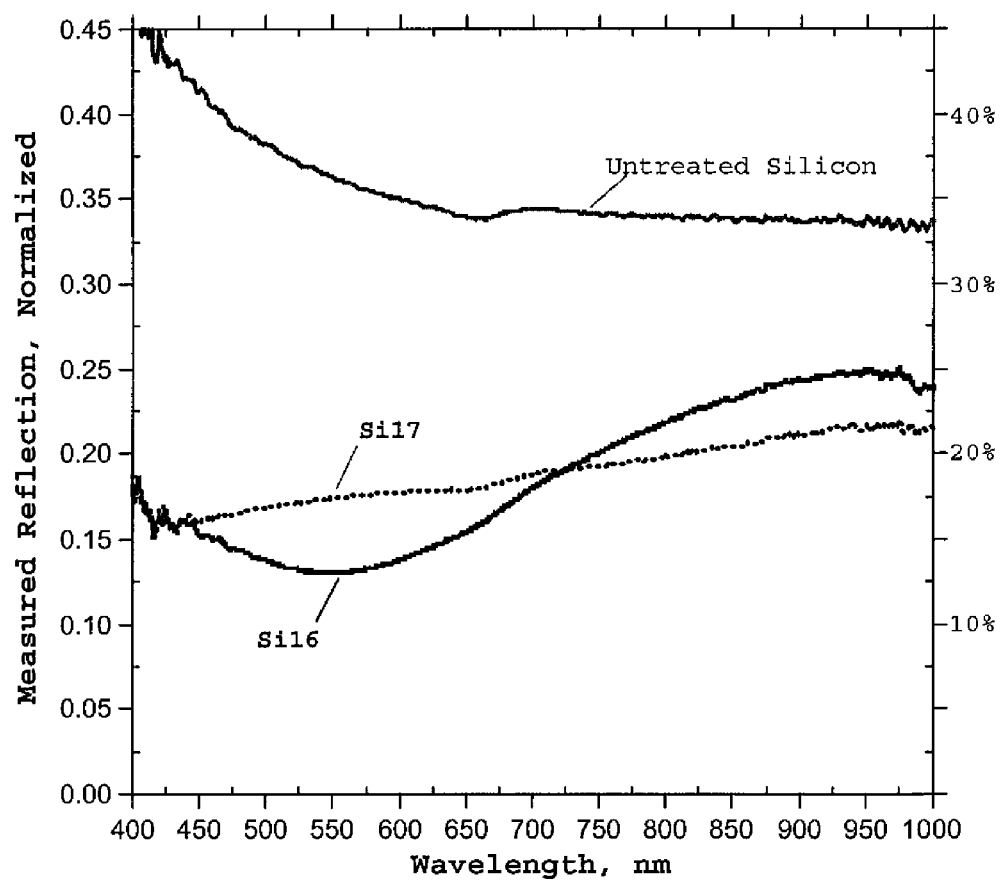
FIG. 20 is a plot of the reflection from a silicon window containing a random texture anti-reflection surface relief structures according to certain principles of the present invention.

A random texture AR treatment designed to eliminate visible light reflections can be applied to silicon camera windows using the RIE technique disclosed above. FIG. 19 shows SEM images of a random texture etched in the surface of a 100 mm diameter, 1 mm thick silicon window similar to the wafers processed by silicon chip camera manufacturers. Overhead (0°), elevation (70°) and profile (90°) views of the fabricated microstructure are shown. A gas mixture of CHF3: O2 in the ratio of 7:1 was again employed. Note that the resulting texture is quite similar to that of the flat windows shown in FIGS. 8, 13 and 15, with column structures about 300 nm high on average and distributed randomly with a maximum spacing of about 200 nm. FIG. 20 shows the measured reflection of light from silicon windows similar to the FIG. 19 window. Again the AR performance is adjusted by varying the RIE etch parameters. The reflectance of prototype window #Sil7 has been reduced from an average of 37% over the visible light spectrum to an average reflection of less than 17%. Further improvement is found with prototype #Sil6 exhibiting a reduction of about 24% over the visible light range but with decreased near infrared performance. By optimizing the RIE process parameters, an average reflectance of less than 1% can be produced. By eye the surfaces produced by in prototypes Sil6 and Sil7 appear grey-brown. With further optimization the surfaces would appear black.

Figure 21:
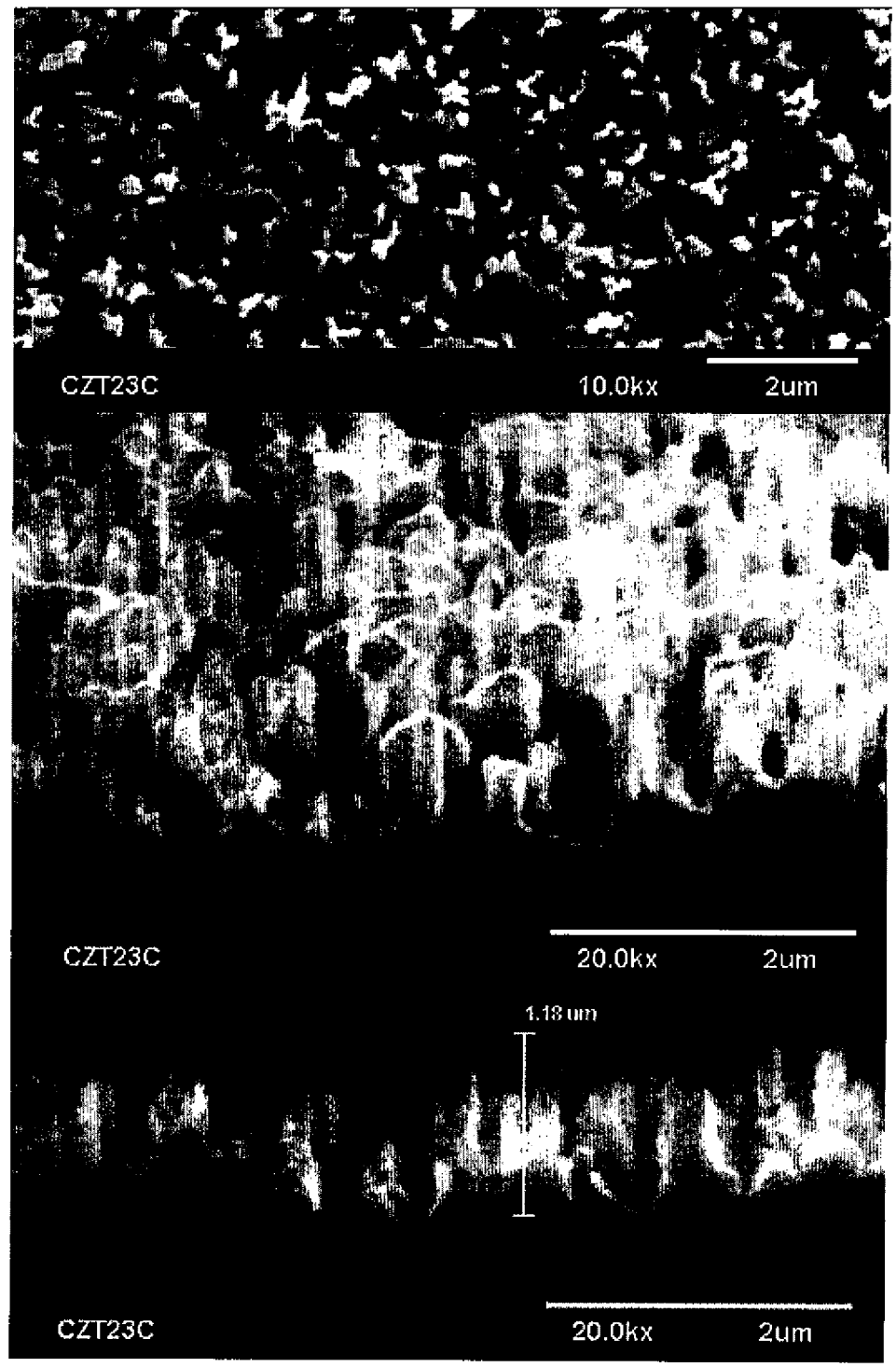
FIG. 21 shows micrographs of a random texture anti-reflection surface relief structure fabricated in a cadmium zinc telluride window according to certain principles of the present invention.

For night vision cameras that operate on longer wavelength infrared light, AR structures are etched deeper into the window or optic surface. An example of a window material used for imaging long wave infrared light over the wavelength range of 7 to 14 micron is cadmium zinc telluride, or CZT. Long wave infrared light transmits through the CZT window and onto an array of detectors built on the backside of the window. Multiple-layer thin-film AR coatings in current use have short lifetimes in space-based systems due to the damage caused by proton exposure. A surface structure AR treatment can be used to enhance the performance and operational lifetime of a space-based infrared imaging system. As with silicon cameras, conventional Motheye AR structures can be fabricated, but the process is difficult to integrate with the highly complex infrared detector array fabrication process. The random texture AR treatment disclosed can be readily integrated into the infrared detector array fabrication process using RIE equipment already in place. FIG. 21 shows SEM images of a random texture etched in the surface of a 20 by 10 mm, 1 mm thick CZT window similar to the windows processed by infrared sensor manufacturers. Overhead (0°), elevation (70°) and profile (90°) views of the fabricated microstructure are shown. A gas mixture of CH4:H2:Ar in the ratio of 1:8:1 was employed. The resulting texture shows more open structures about 1100 nm high on average and distributed randomly with a maximum spacing of about 1000 nm. The visible light appearance of the window is flat black.

Figure 22:
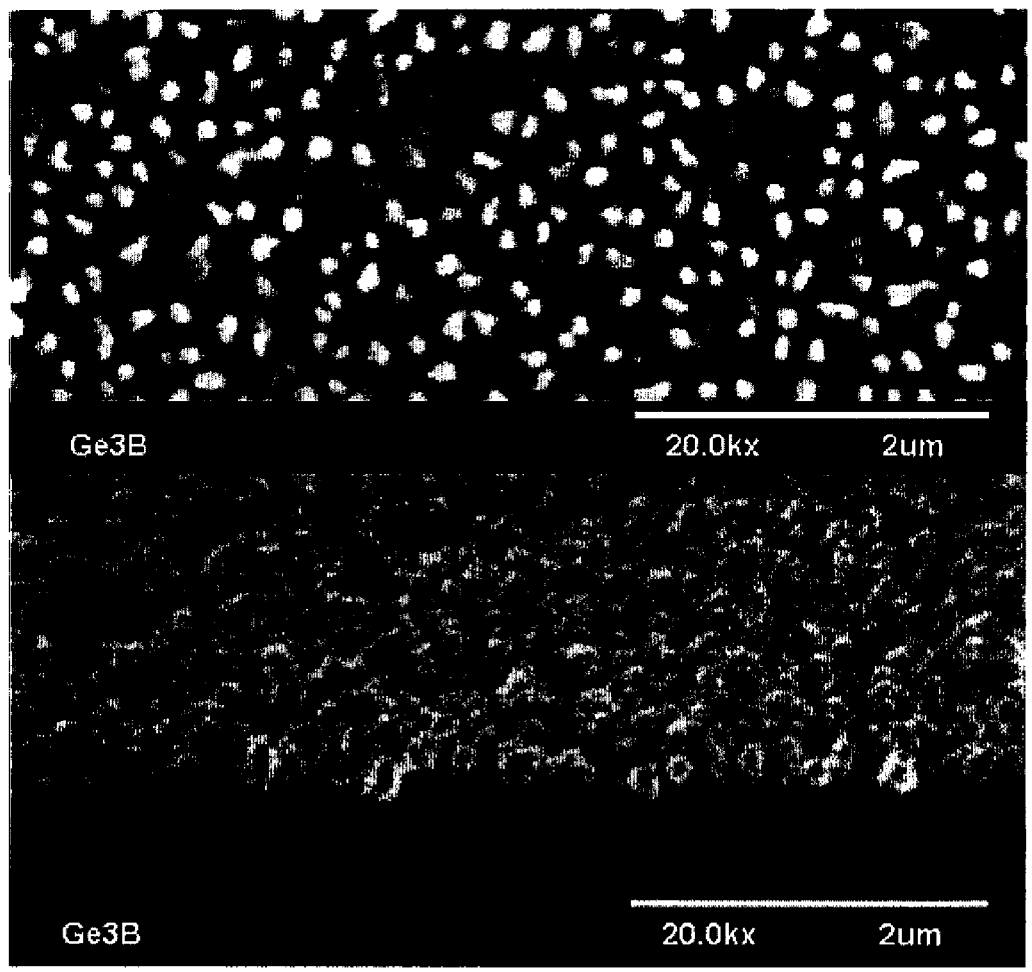
FIG. 22 shows micrographs of a random texture anti-reflection surface relief structure fabricated in a germanium window according to certain principles of the present invention.

Another important infrared transmitting material used for windows, lenses, and sensors in a variety of military and commercial systems is germanium. A random texture AR treatment for germanium is readily produced using the disclosed process. FIG. 22 shows SEM images of a random texture etched in the surface of a 25 mm diameter, 1 mm thick germanium window. Overhead (0°), and elevation (70°) views of the fabricated microstructure are shown. A gas mixture of CHF3:Ar in the ratio of 10:1 was employed. The resulting texture is similar to that found with the silicon window shown in FIG. 19, with column structures about 300 nm high on average and distributed randomly with a maximum spacing of about 300 nm.

While this invention has been particularly shown and described with references to preferred embodiments thereof, it will be understood by those skilled in the art that various changes in form and details may be made therein without departing from the scope of the invention encompassed by the appended claims.

What is claimed is:

1. A process for modifying the flat upper surface of a substrate so as to suppress the reflection and scattering of electromagnetic waves from the substrate surface and thus increase transmission of the electromagnetic waves through the substrate, wherein the electromagnetic waves have known wavelengths, the process employing reactive ion etching that uses spaced electrodes, with an electrical potential applied across the electrodes, the process comprising:
    placing the substrate between the electrodes, where the flat upper substrate surface is directly exposed to the space between the electrodes without a mask on the substrate surface;
    flowing one or more gases in the space between the electrodes;

applying an electrical potential across the electrodes, to create a plasma from the one or more gases, wherein the plasma attacks the substrate surface both chemically and physically, to remove material from the substrate surface;

forming a polymer with the plasma, the polymer formed at random times at random locations on the flat upper substrate surface, the polymer on the surface masking the removal of substrate material at the location of the polymer;

wherein the polymer persists temporarily on the flat upper substrate surface for sufficient time to temporarily mask the removal of substrate material located underneath the formed polymer;

wherein the process is continued for sufficient time to fabricate a surface relief texture on the substrate surface containing surface relief structures;

wherein the surface relief texture has a random distribution of structure spacing and structure depth, where the structure spacing is everywhere smaller than the shortest wavelength of the electromagnetic waves, the structure depth is no less than half the dimension of the largest wavelength of the electromagnetic waves, and the refractive index of the surface relief texture increases generally monotonically from the environment to the bulk material substrate;

wherein with the electromagnetic waves incident on the substrate surface at angles in the range of from 0 to 30 degrees, the loss in transmission of the electromagnetic waves due to reflection from the surface relief texture is less than 0.5% and the loss in transmission of the electromagnetic waves due to scattering from the surface relief texture is no more than 1%.

2. A process as in claim 1 wherein the one or more gases comprise a mixture of tri-fluoromethane, (CHF3), and oxygen.

3. A process as in claim 1 wherein the one or more gases comprise a mixture of tri-fluoromethane, (CHF3), and oxygen in the ratio of about 7 parts CHF3 to about 1 part oxygen.

4. A process as in claim 1 wherein the one or more gases comprise at least two gases selected from the group of gases consisting of tri-fluoromethane, (CHF3), carbon tetrafluoride, (CF4), methane, (CH4), hydrogen, (H2), bromo-tri-fluoromethane, (CBrF3), sulfur hexafluoride, (SF6), argon and oxygen.

5. A process as in claim 1 wherein the substrate material is glass or plastic.

6. The process of claim 1, further comprising employing the resulting substrate surface as a master mold in a standard replication process.

7. The process of claim 1, further comprising replicating the resulting substrate surface into the surface of an alternative substrate.

8. The process of claim 7, further comprising employing the alternative substrate surface as a master mold in a standard replication process.

9. The process of claim 1, wherein the time in which the polymer persists on the substrate surface is adjusted to control a depth of the resulting texture of the substrate surface.

10. The process of claim 1, wherein the time in which the polymer persists on the substrate surface is adjusted to control a spacing of the resulting texture of the substrate surface.

11. The process of claim 1, wherein a quantity of ionized molecules in the plasma is adjusted to control a depth or a spacing of the resulting texture of the substrate surface.

12. A process for modifying the flat upper surface of a substrate so as to suppress the reflection and scattering of electromagnetic waves from the substrate surface and thus increase transmission of the electromagnetic waves through the substrate, wherein the electromagnetic waves have known wavelengths, the process employing reactive ion etching that uses spaced electrodes, with an electrical potential applied across the electrodes, the process comprising:

placing the substrate between the electrodes, where the flat upper substrate surface is directly exposed to the space between the electrodes without a mask on the substrate surface;

flowing a mixture of two or more gases in the space between the electrodes, wherein the two or more gases are selected from the group of gases consisting of tri-fluoromethane, (CHF3), carbon tetrafluoride, (CF4), methane, (CH4), hydrogen, (H2), bromo-tri-fluoromethane, (CBrF3), sulfur hexafluoride, (SF6), argon and oxygen;

applying an electrical potential across the electrodes, to create a plasma from the one or more gases, wherein the plasma attacks the substrate surface both chemically and physically, to remove material from the substrate surface;

forming a polymer with the plasma, the polymer formed at random times at random locations on the flat upper substrate surface, the polymer on the surface masking the removal of substrate material at the location of the polymer;

wherein the polymer persists temporarily on the flat upper substrate surface for sufficient time to temporarily mask the removal of substrate material located underneath the formed polymer;

wherein the process is continued for sufficient time to fabricate a surface relief texture on the substrate surface containing surface relief structures;

wherein the surface relief texture has a random distribution of structure spacing and structure depth, where the structure spacing is everywhere smaller than the shortest wavelength of the electromagnetic waves, the structure depth is no less than half the dimension of the largest wavelength of the electromagnetic waves, and the refractive index of the surface relief texture increases generally monotonically from the environment to the bulk material substrate, and wherein the ratio of the gases in the mixture is adjusted to control a depth or a spacing of the resulting texture of the substrate surface;

wherein with the electromagnetic waves incident on the substrate surface at angles in the range of from 0 to 30 degrees, the loss in transmission of the electromagnetic waves due to reflection from the surface relief texture is less than 0.5% and the loss in transmission of the electromagnetic waves due to scattering from the surface relief texture is no more than 1%.

13. The process of claim 12, wherein the time in which the polymer persists on the substrate surface is adjusted to control a depth or a spacing of the resulting texture of the substrate surface.

14. The process of claim 12, wherein a quantity of ionized molecules in the plasma is adjusted to control a depth or a spacing of the resulting texture of the substrate surface.

* * * * *